US010914829B2

(12) United States Patent
Nakayama et al.

(10) Patent No.: US 10,914,829 B2
(45) Date of Patent: Feb. 9, 2021

(54) POSITIONING SENSOR, SENSOR, AND METHOD

(71) Applicant: Panasonic Intellectual Property Management Co., Ltd., Osaka (JP)

(72) Inventors: Takeshi Nakayama, Hyogo (JP); Shoichi Iizuka, Osaka (JP); Naoki Honma, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 353 days.

(21) Appl. No.: 15/865,956

(22) Filed: Jan. 9, 2018

(65) Prior Publication Data
US 2018/0217248 A1 Aug. 2, 2018

(30) Foreign Application Priority Data

Jan. 27, 2017 (JP) .................. 2017-013654
Sep. 27, 2017 (JP) .................. 2017-187187

(51) Int. Cl.
G01S 13/48 (2006.01)
G01S 5/02 (2010.01)
(Continued)

(52) U.S. Cl.
CPC .............. G01S 13/48 (2013.01); G01S 3/043 (2013.01); G01S 3/28 (2013.01); G01S 3/74 (2013.01);
(Continued)

(58) Field of Classification Search
CPC ... G01S 13/48; G01S 3/28; G01S 3/74; G01S 3/043
See application file for complete search history.

(56) References Cited

U.S. PATENT DOCUMENTS

2006/0261968 A1* 11/2006 Shirakawa ................ G01S 3/38
340/671
2012/0127016 A1 5/2012 Watanabe et al.
(Continued)

FOREIGN PATENT DOCUMENTS

JP 8-334557 12/1996
JP 2000-258530 9/2000
(Continued)

Primary Examiner — Marc Anthony Armand
(74) Attorney, Agent, or Firm — Greenblum & Bernstein, P.L.C.

(57) ABSTRACT

A positioning sensor includes m receiving antennas connected to a feeder circuit and n variable loads, and a receiver that receives a first signal via the m receiving antennas. The positioning sensor further includes a memory that stores a first signal strength value of a first signal that the receiver receives when a variable load varies in value, and a processor that calculates a second signal strength value from a complex propagation channel, searches for a complex propagation channel candidate that has a minimum difference between a first signal strength and a second signal strength, determines the complex propagation channel candidate to be a complex propagation channel when the receiver receives the first signal, and estimates an incoming direction of the first signal from the determined complex propagation channel.

16 Claims, 15 Drawing Sheets

(51) Int. Cl.
  *G01S 3/04*   (2006.01)
  *G01S 13/00*  (2006.01)
  *G01S 3/74*   (2006.01)
  *G01S 7/41*   (2006.01)
  *G01S 3/28*   (2006.01)
  *G01S 13/88*  (2006.01)
  *G01S 13/42*  (2006.01)
  *G01S 13/02*  (2006.01)

(52) U.S. Cl.
  CPC .......... *G01S 5/0252* (2013.01); *G01S 5/0273* (2013.01); *G01S 7/415* (2013.01); *G01S 13/003* (2013.01); *G01S 13/42* (2013.01); *G01S 13/88* (2013.01); *G01S 13/887* (2013.01); *G01S 2013/0263* (2013.01)

(56) References Cited

U.S. PATENT DOCUMENTS

2013/0335257 A1   12/2013   Abrahamson
2014/0002296 A1    1/2014   Izumi
2016/0030006 A1    2/2016   Okuya et al.
2016/0103199 A1*   4/2016   Rappaport ................ G01S 3/48
                                                       342/377

FOREIGN PATENT DOCUMENTS

| JP | 2006-329658 | 12/2006 |
| JP | 2008-244697 | 10/2008 |
| JP | 2012-112653 | 6/2012 |
| JP | 2014-002053 | 1/2014 |
| JP | 2014-512526 | 5/2014 |
| JP | 2014-215044 | 11/2014 |
| JP | 2014-215200 | 11/2014 |
| JP | 2015-072173 | 4/2015 |
| JP | 2015-117961 | 6/2015 |
| JP | 2015-117972 | 6/2015 |
| JP | 2015-119770 | 7/2015 |
| JP | 2015-175700 | 10/2015 |

* cited by examiner

POSITIONING SENSOR, SENSOR, AND METHOD

BACKGROUND

1. Technical Field

The present disclosure relates to a positioning sensor, a sensor, and a method for fixing a position of a living body, such as a human, using microwave.

2. Description of the Related Art

The use of radio signals is under study to find a position and state of a person. For example, Japanese Unexamined Patent Application Publication No. 2015-117972 discloses an estimation method of finding a position or state of a person serving as a detection target by analyzing a Doppler shift using Fourier transform.

The related art technique disclosed in Japanese Unexamined Patent Application Publication No. 2015-117972 uses multiple antennas that are able to observe a delay time in an incoming signal or phase information. The phase information of a transmitter side is to be acquired to estimate the position of and direction to a person.

SUMMARY

In one general aspect, the techniques disclosed here feature a positioning sensor. The positioning sensor includes m receiving antennas (m is an integer equal to or above 1), a feeder circuit that is connected to the receiving antennas, n variable loads connected to the feeder circuit (n is an integer equal to or above 1), a receiver that receives via the receiving antennas and the feeder circuit a first signal responsive to a signal that a transmitter has transmitted in a specific area from the positioning sensor within which a moving object is likely to be present, a controller that sets an impedance value for each variable load, a memory that stores a first signal strength value indicating a strength of the first signal responsive to the impedance value of the variable load that is set by the controller, and a processor that sets multiple candidates for a complex propagation channel indicating signal propagation characteristics between the transmitter and the receiver, calculates multiple second signal strength values when the receiver receives a second signal transmitted from the transmitter, the second signal strength value indicating a strength of the second signal, the second signal strength values respectively corresponding to the candidates, estimates the complex propagation channel by selecting a candidate responsive to a minimum difference from among differences between the first signal strength value and each of the second signal strength values, and estimates an incoming direction of the first signal to the positioning sensor, based on the complex propagation channel.

According to the disclosure, a direction in which a moving object is present is estimated from a radio signal that a receiver side receives without acquiring phase information of a transmitter side.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
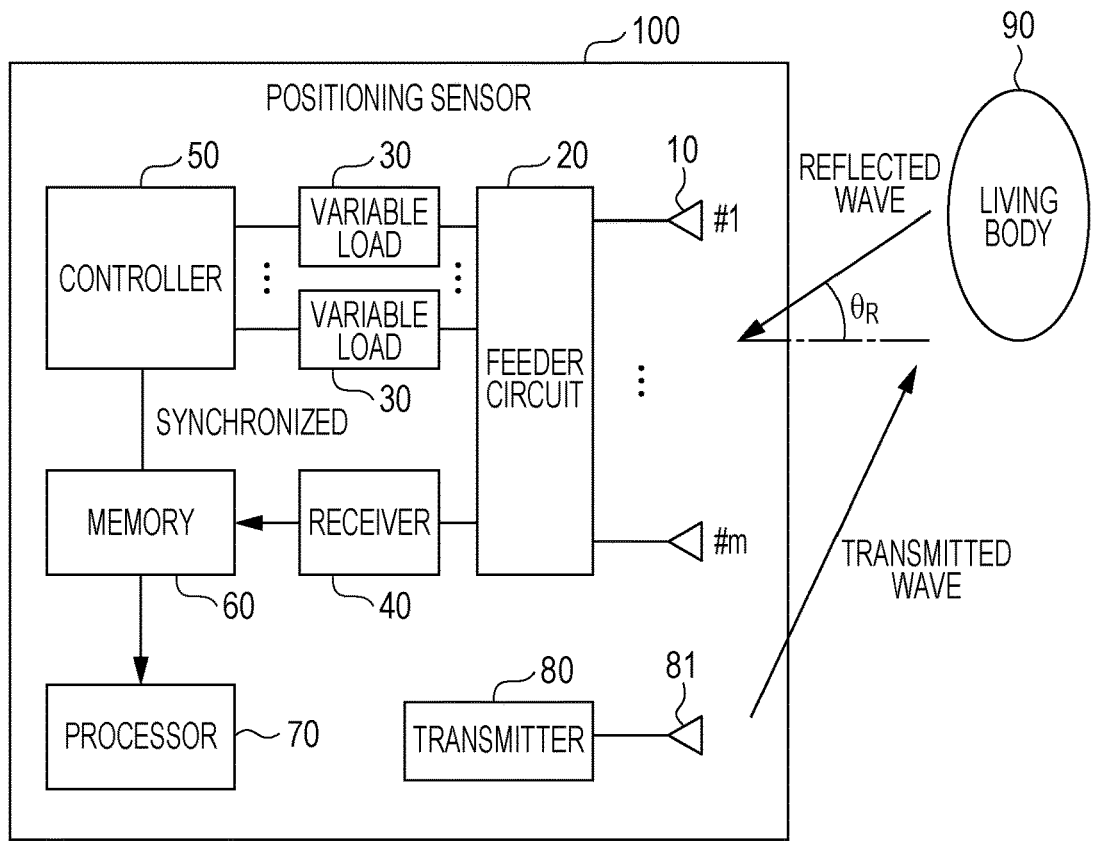
FIG. 1 is a block diagram illustrating a configuration example of a positioning sensor of a first embodiment.

Underlying Knowledge Forming Basis of the Present Disclosure

The use of radio signals is under study to learn the location or state of a person.

Japanese Unexamined Patent Application Publication No. 2015-117972 discloses a technique of detecting the location and state of a person by analyzing component containing a Doppler shift using Fourier transform. More specifically, according to the disclosure, an antenna array including multiple antenna elements is used for transmission and reception, and a complex propagation channel is observed between the antenna elements. The complex propagation channel is represented by a matrix having elements, the number of which is equal to the number of transmitting antennas multiplied by the number of receiving numbers. In the complex propagation channel, the absolute value of each element (a complex propagation channel element) represents an amplitude, and the argument of the complex propagation channel element represents a phase. The time response of the complex propagation channel element is Fourier-transformed into a frequency response matrix, and only an alternating current (AC) component is extracted from the frequency response matrix. This operation is equivalent to the extraction of a Doppler shift component. The extracted AC component is also represented by a matrix. A correlation matrix is determined from the AC component of the frequency response matrix, and an incoming direction estimation is performed on the correlation matrix to detect the direction and location of a detection target.

According to Japanese Unexamined Patent Application Publication Nos. 2015-072173, 2015-119770, 2014-512526, and 2014-215200, an observed signal is Fourier-transformed and a Doppler component attributed to a person (living body) serving a detection target is extracted and analyzed in a way similar to the technique disclosed in Japanese Unexamined Patent Application Publication No. 2015-117972. The state of the living body, such as the location, heartbeat and respiration of the living body, is sensed. Japanese Unexamined Patent Application Publication No. 2015-117961 discloses a technique of performing a high-speed beam scan by adjusting a variable impedance array, and estimating an incoming signal direction from a target in accordance with a reflected wave. Japanese Unexamined Patent Application Publication No. 2006-329658 discloses a technique of estimating the location of a target object by mounting directional sensors having respectively different frequencies orientating in different directions, and by estimating a range and angle to a target using reflected waves. Japanese Unexamined Patent Application Publication No. 2015-175700 discloses a technique of estimating the location of a target object by mounting multiple antennas that observe a delay time of an incoming wave or phase information. Japanese Unexamined Patent Application Publication No. 2008-244697 discloses a technique of operating antenna directivity by configuring a feeder circuit into an electronically steerable passive array (ESPAR) antenna with an inverted F antenna.

A technique of detecting the location and direction of a human body without using Fourier transform is disclosed, for example, in F. Adib, Z. Kabelac, D. Katabi, and R. Miller, "3D tracking via body radio reflections", 11th USENIX Symp. Net. Systems Design & Imp 1. (USENIX NSI'14), April, 2014. According to the disclosed technique, a variation component is extracted without performing Fourier transform, a propagation response is measured in advance in an unmanned state, and a difference component between the unmanned state and manned state is attributed to the presence of a person. By analyzing the difference component, the location of the person is estimated. In accordance with this technique, a frequency response in a wide range of 1 GHz is observed to estimate a location, a propagation time of an extracted wave reflected from a person is calculated, a range to each of the multiple antennas mounted in different places is estimated, and the location of the person is estimated using the estimated ranges. Another technique is disclosed in Dai Sasakawa, Keita Konno, Naoki Honma, Kentaro Nishimori, Nobuyasu Takemura, Tsutomu Mitsui, "Fast Estimation Algorithm for Living Body Radar", 2014 International Symposium on Antennas and Propagation (ISAP 2014), FR3D, pp. 583-584, December 2014. According to the disclosure, a time response of a complex propagation channel is observed in a manned state, and one complex propagation channel at a time point is subtracted from another complex propagation channel at another time point. In this way, only a wave that is reflected from a human and is free from a reflection component attributed to structures, such as walls is extracted.

An estimation technique to estimate an incoming direction of a radio wave using a parasitic antenna is disclosed in Plapous Cyril, Cheng Jun, Taillefer Eddy, Akihito Hirata, and Takashi Ohira, "Reactance-domain MUSIC algorithm for ESPAR antennas" the Institute of Electronics, Information and Communication Engineers Technical Report RCS2002-147, pp. 1-8, August 2002. According to the disclosure, an apparatus includes a fed antenna having a single element and multiple parasitic antennas surrounding the fed antenna. More specifically, a single receiver that observes a phase is connected to a single receiving antenna (the fed antenna) having the one element, and the parasitic antennas connected to variable loads are mounted in a circle surrounding the receiving antenna. Since a reception signal of the receiver varies in response to a value of the variable load of the parasitic antenna, the incoming direction of the radio wave is estimated from a response with the value of the variable load of the parasitic antenna varied (a complex signal received at that time).

Single-element antennas disclosed in Japanese Unexamined Patent Application Publication Nos. 2014-512526 and 2014-215200 sufficiently work to detect a Doppler shift attributed to the respiration or heartbeat of a person, but multiple antennas are to be used to observe a delay time in the incoming wave or phase information to estimate the location of and direction to the person.

The single-element antennas disclosed in Japanese Unexamined Patent Application Publication Nos. 2014-512526 and 2014-215200 have difficulty in estimating the location of and direction to the person.

With the techniques disclosed in Japanese Unexamined Patent Application Publication Nos. 2015-117972, 2015-072173, 2015-119770, and 2015-117961, and articles "3D tracking via body radio reflections" and "Fast Estimation Algorithm for Living Body Radar", multiple antennas are used, and the location of and direction to the person may be estimated. However, multiple receivers that precisely measure a delay time and phase of a signal are to be used to estimate the location of and direction to the person. This leads to a cost increase of the apparatus in use.

In the technique disclosed in the article entitled "Reactance-domain MUSIC algorithm for ESPAR antennas", the single receiver that observes phase is connected to the single-element antenna, and the multiple parasitic antennas connected to the variable load are placed in the circle surrounding the receiving antenna. In accordance with this technique, the direction of the incoming wave is estimated from the response with the value of the variable load of the parasitic antenna varied. In accordance with this technique, the same reception signal is to be received each time the value of the variable load is varied. Further, an accurate phase value of the reception signal is to be detected. This means that reference oscillators in a transmitter and receiver are to be fully synchronized in terms of phase level, or a common reference oscillator is to be used on the transmitter and receiver. If the transmitter and receiver are separately mounted, a connection therebetween is difficult. This involves costly reference oscillators that are enabled to be synchronized at phase level. Since a variation in the complex propagation channel caused by a living body is a period on the order of one second, a phase level synchronization is to be held at least during the period on the order of one second. Such reference oscillators are used to determine whether the variation in the complex propagation channel is caused by the living body or a frequency difference between the reference oscillators of the transmitter and receiver.

The technique disclosed in Japanese Unexamined Patent Application Publication No. 2015-117961 may estimate the direction in a narrow sector using a narrow directional beam. A wider directional beam is to be used to estimate a direction in a wider sector. Since the technique disclosed in Japanese Unexamined Patent Application Publication No. 2015-117961 dispenses with a transmitter, the phase information is not used on the transmitter. The technique disclosed in Japanese Unexamined Patent Application Publication No. 2015-117961 has a lower resolution in direction estimation. Similarly, in the technique disclosed in Japanese Unexamined Patent Application Publication No. 2006-329658, if the number of antennas is reduced in the direction estimation in a wider sector, an overlapping sector between antennas is narrower, leading to a lower resolution in the direction estimation.

Currently under study is a radar with an arrayed antenna estimating a direction of a living body in a radio wave propagation environment where multiple radio waves are present. The radar makes use of a Doppler shift caused in a radio wave responsive to a body process, such as aspiration or heartbeat of a living body. More specifically, a radio wave is directed to a living body, a signal received from the living body is then Fourier-transformed to remove a signal component that has not passed through the living body, and the direction to the living body is estimated by estimating the incoming direction of the radio wave reflected from the living body.

However, a receiver is used for each antenna element to construct such an arrayed antenna. The scale of the hardware structure is increased. Additionally, a precise phase difference between antenna elements is to be detected in the received signal. This is another factor that increases the scale of the hardware structure.

In view of these problems, the inventors have arrived at an idea of estimating a direction in which a moving object is present from a radio signal received at a receiver side having a simple hardware structure (with a smaller number of receivers) that does not acquire phase information from a transmitter side. The disclosure is related to a positioning sensor, a sensor, and a method for estimating the direction of the moving object.

According to one aspect of the disclosure, there is provided a positioning sensor. The positioning sensor includes m receiving antennas (m is an integer equal to or above 1), a feeder circuit that is connected to the receiving antennas, n variable loads connected to the feeder circuit (n is an integer equal to or above 1), a receiver that receives via the receiving antennas and the feeder circuit a first signal responsive to a signal that a transmitter has transmitted in a specific area from the positioning sensor within which a moving object is likely to be present, a controller that sets an impedance value for each variable load, a memory that stores a first signal strength value indicating a strength of the first signal responsive to the impedance value of the variable load that is set by the controller, and a processor that sets multiple candidates for a complex propagation channel indicating signal propagation characteristics between the transmitter and the receiver, calculates multiple second signal strength values when the receiver receives a second signal transmitted from the transmitter, the second signal strength value indicating a strength of the second signal, the second signal strength values respectively corresponding to the candidates, estimates the complex propagation channel by selecting a candidate responsive to a minimum difference from among differences between the first signal strength value and each of the second signal strength values, and estimates an incoming direction of the first signal to the positioning sensor, based on the complex propagation channel.

The direction to the moving object may be estimated from a radio signal received by the receiver side without acquiring the phase information from the transmitter side. Since the m receiving antennas are connected to the feeder circuit, the freedom of layout design of the m receiving antennas is increased.

The processor may estimate a first complex propagation channel as the complex propagation channel if a time variation in the first signal strength value is equal to or below a predetermined value, estimate a second complex propagation channel as the complex propagation channel if the time variation in the first signal strength value is above the predetermined value, calculate a first correlation matrix indicating a correlation matrix for the first complex propagation channel, calculates a second correlation matrix indicating a correlation matrix for the second complex propagation channel, calculate a third correlation matrix by subtracting the first correlation matrix from the second correlation matrix, and estimate the incoming direction of the first signal to the positioning sensor in accordance with the third correlation matrix.

If the time variation in the first signal strength value is equal to or below the predetermined value, the first signal does not contain a signal reflected from the moving object in response to the transmitted signal incident on the moving object. If the time variation in the first signal strength value is above the predetermined value, the first signal contains the reflected signal.

The processor may estimate a first complex propagation channel as the complex propagation channel at a first time point, estimate a second complex propagation channel as the complex propagation channel at a second time point subsequent to the first time point, calculate a phase difference between the first complex propagation channel and the second complex propagation channel using the first complex propagation channel and the second complex propagation channel, determine a phase angle having a minimum phase difference, calculate a third complex propagation channel by subtracting the first complex propagation channel provided with the phase angle from the second complex propagation channel provided with the phase angle, calculate a correlation matrix of the third complex propagation channel, and estimate the incoming direction of the first signal to the positioning sensor.

According to yet another aspect of the disclosure, there is provided a sensor. The sensor includes the multiple positioning sensors mounted in mutually different locations. The sensor estimates the location of the moving body, based on the incoming direction of the first signal to each of the positioning sensors.

According to yet another aspect of the disclosure, there is provided a positioning sensor. The positioning sensor includes m receiving antennas (m is an integer equal to or above 1), a feeder circuit that is connected to the receiving antennas, n variable loads connected to the feeder circuit (n is an integer equal to or above 1), a receiver that receives via the receiving antennas and the feeder circuit a first signal responsive to a signal that a transmitter has transmitted in a specific area from the positioning sensor within which a moving object is likely to be present, a controller that sets an impedance value for each variable load, a memory, and a processor. The controller sets K impedance values to each variable load (K is an integer equal to or above 2). The receiver receives, by L times, the first signal responsive to each of the K impedance values of the variable load (L is an integer equal to or above 2). The memory stores L first signal strength values responsive to each of the K impedance values of the variable loads, the first signal strength value indicating a strength of the first signal. The processor calculates an average value of the L first signal strength values responsive to each of the K impedance values of the variable load, calculates K×L second signal strength values by subtracting the average value from each of the L first signal strength values responsive to each of the K impedance values of the variable load, sets M candidates, each having K elements (M is an integer equal to or above 2), to the L complex propagation channels responsive to the L first signals, the complex propagation channel indicating signal propagation characteristics between the transmitter and the receiver, calculates M third signal strength values, each having K elements, the third signal strength value being received by the receiver when the variable load is set to be in the K impedance values with respect to each of the L complex propagation channels, estimates the L complex propagation channels by selecting a candidate responsive to a minimum difference from among differences between the M third signal strength values and the corresponding second signal strength values with respect to each of the L complex propagation channels, calculates a correlation matrix for each of the L complex propagation channels, and estimates an incoming direction of the first signal to the positioning sensor in accordance with the correlation matrix.

General or specific embodiments may be implemented as a system, a method, an integrated circuit, a computer program, a non-transitory computer readable recording medium such as CD-ROM, or any selective combination thereof.

Each of the embodiments is described in detail below referring to the drawings. The embodiments are desired examples of the disclosure. Numerical values, shapes, materials, elements, layout positions of the elements, connection forms, steps, and the order of the steps described in the embodiments are described for exemplary purposes only, and are not intended to limit the disclosure. From among the elements of the embodiments, elements not described in independent claims indicative of a generic concept may be any elements that form a more desirable form. In the specification and the drawings, elements having a substantially identical functionality are designated with the same reference numerals, and the discussion thereof is not repeated.

First Embodiment 1.1 Configuration of Positioning Sensor

Figure 2:
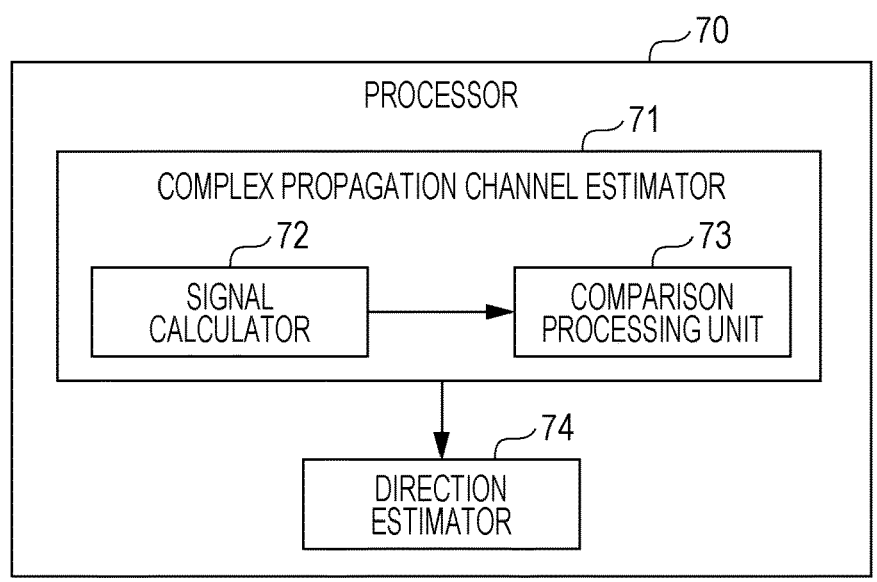
FIG. 2 is a functional block diagram of a processor of the first embodiment.

FIG. 1 is a block diagram illustrating a configuration example of a positioning sensor 100 of a first embodiment. FIG. 2 is a functional block diagram of a processor 70 of the first embodiment.

The positioning sensor 100 of FIG. 1 includes m receiving antennas 10 (m is an integer equal to or above 1), a feeder circuit 20 connected to the m receiving antennas 10, n variable loads 30 (n is an integer equal to or above 1) connected to the feeder circuit 20, a receiver 40, a controller 50, a memory 60, and the processor 70. The positioning sensor 100 may further include a transmitter 80 connected to a transmitting antenna 81. The positioning sensor 100 estimates a direction $\theta_R$ in which a living body 90 serving as a detection target is present.

The m receiving antennas 10 are arranged in a first direction to form an arrayed antenna. Alternatively, the receiving antenna 10 may be arranged in a first direction and a second direction to form an arrayed antenna.

The receiver 40 receives a first signal via the feeder circuit 20. The first signal to be received by the receiver 40 is acquired when the receiving antennas 10 receive a transmission signal that the transmitter 80 has transmitted in a specific coverage from the positioning sensor 100.

A signal generated by the transmitter 80 (namely, a transmission wave) is transmitted via a single transmitting antenna 81 connected to the transmitter 80. A signal arrived at the m receiving antennas 10 (namely, a reflected wave) is modulated by the n variable loads 30 connected to the feeder circuit 20, and is observed by the receiver 40 after being passed through the feeder circuit 20.

The controller 50 controls the n variable loads 30. More specifically, the controller 50 sets impedance values of the variable loads 30.

The memory 60 stores a first signal strength value indicating a strength of the first signal responsive to the set impedance values of the n variable loads 30 when the controller 50 sets the impedance values of the n variable loads 30. In other words, the memory 60 stores, together with a first value, the first signal strength value of the first signal received by the receiver 40 when the controller 50 sets the impedance values of the n variable loads 30 to be the first value. More specifically, the memory 60 stores the first signal strength value of the first signal that the receiver 40 receives in synchronization with the controller 50. The memory 60 thus stores the first signal strength values in response to variations in the n variable loads 30 in a time-lapsed series. The memory 60 stores the first signal strength values as strength information. In the first embodiment, the stored first signal strength value is related to amplitude only. In other words, phase is not observed.

The processor 70 performs a variety of processes using the first signal strength values stored on the memory 60. The functional configuration of the processor 70 is described with reference to FIG. 2.

Referring to FIG. 2, the processor 70 in the functional configuration thereof includes a complex propagation channel estimator 71 and a direction estimator 74.

The complex propagation channel estimator 71 includes a signal calculator 72, and a comparison processing unit 73.

The signal calculator 72 calculates a second signal strength value of a second signal from a test complex propagation channel having a specific value set thereto. More specifically, the signal calculator 72 sets multiple candidates for the complex propagation channel indicating signal propagation characteristics between the transmitter 80 and the receiver 40, and calculates multiple second signal strength values based on the assumption that the receiver 40 receives a second signal transmitted from the transmitter 80. The second signal strength value indicates a strength of the second signal. The multiple second signal strength values correspond to the multiple candidates.

The comparison processing unit 73 searches for a value of the complex propagation channel by selecting a candidate corresponding to a minimum value of differences between the first signal strength value and the multiple second signal strength values using the value the variable load 30. More specifically, the comparison processing unit 73 calculates a difference between the first signal strength value and each of the multiple second signal strength values, thereby calculating multiple differences. The comparison processing unit 73 selects a candidate corresponding to the second signal strength value causing a minimum difference from the calculated differences. The comparison processing unit 73 estimates the complex propagation channel corresponding to the selected candidate to the complex propagation channel through which the receiver 40 has received the first signal. In this way, from the first signal strength value output from the memory 60, the complex propagation channel estimator 71 estimates the complex propagation channel through which the receiver 40 has received the first signal.

The direction estimator 74 estimates the incoming direction $\theta_R$ of the first signal to the positioning sensor 100, based on the complex propagation channel estimated by the complex propagation channel estimator 71. In accordance with the first embodiment, the first signal is a wave reflected from the living body 90 as illustrated in FIG. 1. Based on the complex propagation channel estimated by the complex propagation channel estimator 71, the direction estimator 74 estimates a direction in which the living body 90 is present.

1.2 Process of Positioning Sensor

Figure 3:
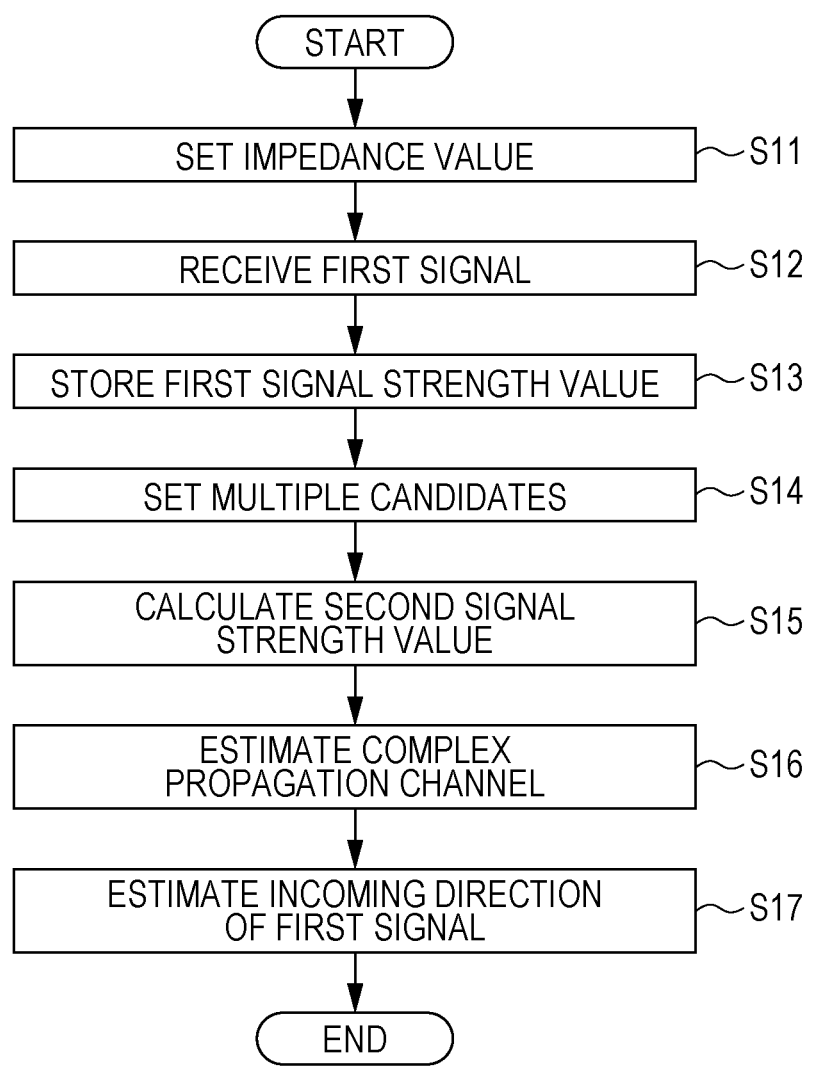
FIG. 3 is a flowchart schematically illustrating a direction estimation process of the positioning sensor of the first embodiment.

A direction estimation process of the positioning sensor 100 thus constructed is described below. FIG. 3 is a flowchart schematically illustrating the direction estimation process of the positioning sensor 100 of the first embodiment.

The controller 50 in the positioning sensor 100 sets an impedance value for the variable load 30 (S11).

The receiver 40 receives the first signal (S12).

When the controller 50 sets the impedance values of the n variable loads 30, the memory 60 stores the first signal strength values indicating the strength of the first signal corresponding to the set impedance values of the n variable loads 30 (S13).

The processor 70 sets multiple candidates for the complex propagation channel indicating the signal propagation characteristics between the transmitter 80 and the receiver 40 (S14).

The processor 70 calculates the multiple second signal strength values, based on the assumption that the receiver 40 has received the second signal transmitted from the transmitter 80 (S15).

The processor 70 estimates the complex propagation channel by selecting the candidate corresponding to a minimum value of differences between the first signal strength value and the multiple second signal strength values (S16).

The processor 70 estimates the incoming direction of the first signal to the positioning sensor 100 in accordance with the complex propagation channel (S17).

The direction estimation process of the positioning sensor 100 described with reference to FIG. 3 is described in detail with reference to FIG. 4 through FIG. 6.

Figure 4:
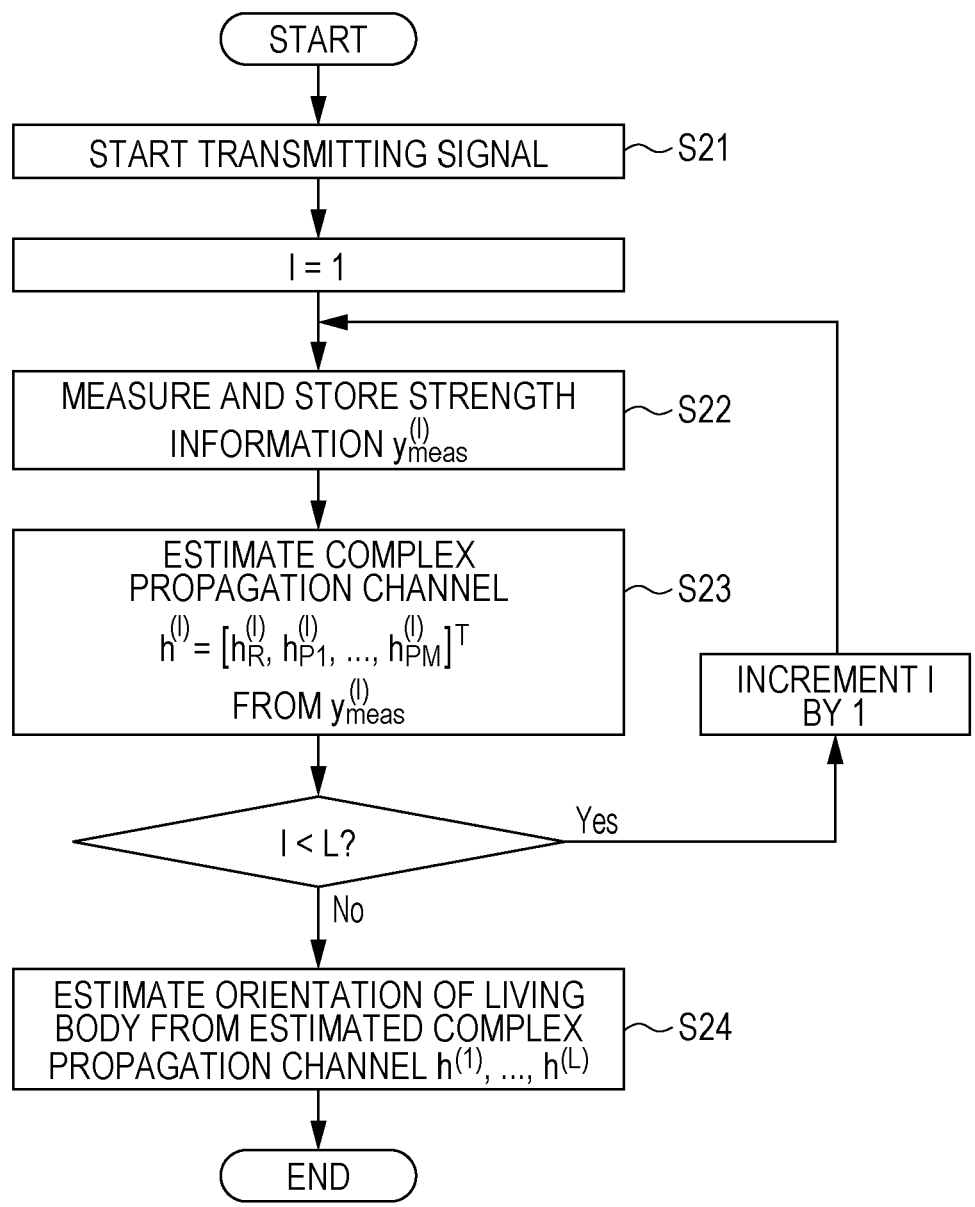
FIG. 4 is a flowchart illustrating in detail the direction estimation process of the positioning sensor of the first embodiment.

FIG. 4 is a flowchart illustrating in detail the direction estimation process of the positioning sensor 100 of the first embodiment. FIG. 5 is a flowchart illustrating in detail an operation in step S23 of FIG. 4. FIG. 6 is a flowchart illustrating in detail an operation in step S24 of FIG. 4.

Referring to FIG. 4, the transmitter 80 starts transmitting a signal (S21). In accordance with the first embodiment, the transmitter 80 of FIG. 1 transmits the signal (transmission wave) via the transmitting antenna 81.

The living body 90 stays standstill in the direction $\theta_R$ if viewed from an arrayed antenna of the m receiving antennas 10.

The positioning sensor 100 measures and accumulates strength information $y^{(I)}_{meas}$ (S22). The strength information $y^{(I)}_{meas}$ is the first signal strength value of the first signal received by the receiver 40. In the strength information $y^{(I)}_{meas}$, I represents an index number, and is the number of iterations by which the complex propagation channel is estimated from the strength information.

Figure 5:
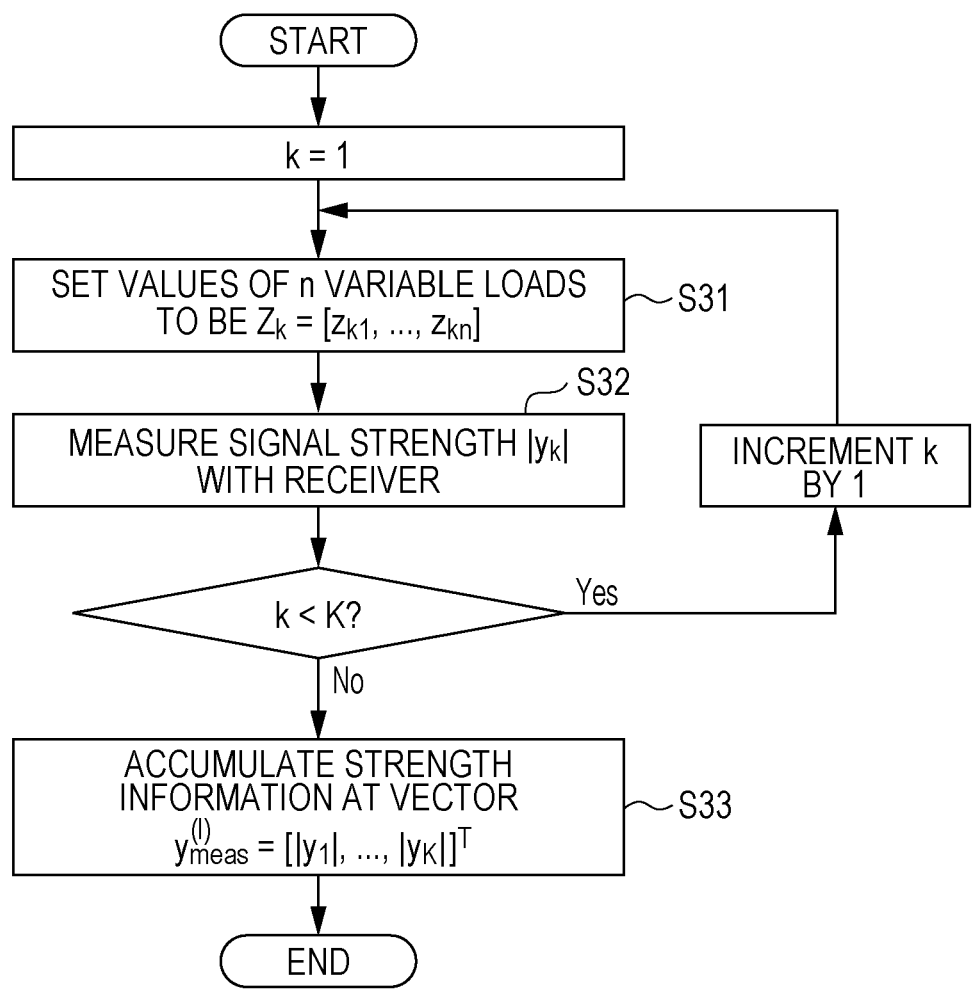
FIG. 5 is a flowchart illustrating in detail an operation in step S23 of FIG. 4.

More specifically, the controller 50 sets values for the n variable loads 30 as illustrated in FIG. 5 (S31). The positioning sensor 100 may now include the m receiving antennas 10 that are terminated with the variable loads 30. The values of the n variable loads 30 (the values of variable impedances) are represented as $Z_k=[z_{k1}, \ldots, z_{kn}]$ using a test count k. The receiver 40 measures the signal strength |yk| (S32). The positioning sensor 100 iterates the operations in S31 and S32 by changing the values of the n variable loads 30. The positioning sensor 100 measures the signal strength |yk| by changing the n variable loads 30 to K different values. K values of $Z_k$ of each of the n variable loads 30 are different from each other ($Z_1 \neq Z_2, \ldots, \neq Z_K$). The memory 60 accumulates the strength information $y^{(I)}_{meas}$ measured by the receiver 40 when the value of each of the n variable loads 30 is changed to K values (S33). K pieces of strength information $y^{(I)}_{meas}$ thus obtained are expressed by a vector as described below:

$$y^{(I)}_{meas}=[|y^{(I)}_1|, \ldots, |y^{(I)}_K|]^T \qquad (1)$$

In formula (1), let I represent an index number, and $[\bullet]^T$ represent a transpose operation.

Let s represent the signal reflected from the living body, a signal strength y(I)k of the received signal is expressed by formula (2):

$$y^{(I)}_k=D_{array}(\theta_R)s=[D_1(\theta), \ldots, D_m(\theta)]\Phi(\Gamma_{Pk})s \qquad (2)$$

$\Gamma_{Pk}$ represents a reflectance coefficient corresponding to a combination of impedance values of a k-th variable load. The strength information represented by formulas (1) and (2) is output to the complex propagation channel estimator 71 as the first signal.

The positioning sensor 100 estimates a complex propagation channel $h^{(I)}$ when the receiver 40 receives the first signal from the strength information $y^{(I)}_{meas}$ (S23).

Figure 6:
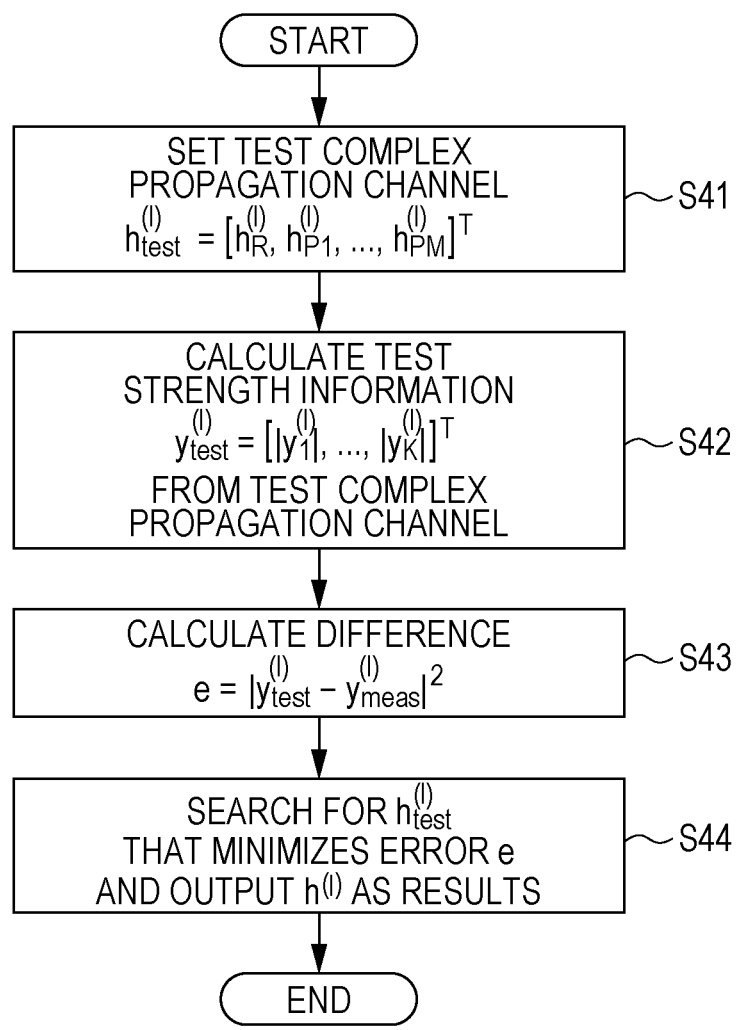
FIG. 6 is a flowchart illustrating in detail an operation in step S24 of FIG. 4.

More specifically, the complex propagation channel estimator 71 sets a test complex propagation channel $h^{(I)}_{test}$ as illustrated in FIG. 6 (S41). Any value (a real part and an imaginary part) may be set to the test complex propagation channel $h^{(I)}_{test}$ as expressed in the following formula (3):

$$h^{(I)}_{test}=[h^{(I)}_R, h^{(I)}_{P1}, \ldots, h^{(I)}_{PM}]^T \qquad (3)$$

The complex propagation channel estimator 71 then calculates test strength information $y^{(I)}_{test}$ from the test complex propagation channel $h^{(I)}_{test}$ (S42). The test strength information $y^{(I)}_{test}$ is strength information that the receiver 40 is determined to receive in step S22 with a known variable load, and corresponds to the second signal strength value of the second signal. The test strength information $y^{(I)}_{test}$ is calculated as expressed below:

$$y^{(I)}_{test}=[|y^{(I)}_1|, \ldots, |y^{(1)}_R|]^T \qquad (4)$$

The complex propagation channel estimator 71 calculates a difference (error e) between the strength information $y^{(I)}_{meas}$ as the first signal strength value of the first signal and the test strength information $y^{(I)}_{test}$ as the second signal strength value of the second signal (S43). The difference (error e) is calculated in accordance with the following formula (5):

$$e = |y^{(I)}_{test} - y^{(I)}_{meas}|^2 \qquad (5)$$

The complex propagation channel estimator 71 searches for the test complex propagation channel $h^{(I)}_{test}$ that minimizes the difference e, and then outputs the test complex propagation channel $h^{(I)}_{test}$ minimizing the difference e as the complex propagation channel $h^{(I)}$ (S44).

Turning back to FIG. 4, the direction estimation process is further discussed.

The positioning sensor 100 iterates the measurement operation described in step S22 by L times, and performs the estimation operation described in step S23 each time the measurement operation is iterated.

The positioning sensor 100 estimates the direction to the living body 90 from the complex propagation channel $h^{(1)}, \ldots, h^{(I)}$ estimated in step S23 (S24).

1.3 Principle of Estimation Process

Described below is a principle according to which the complex propagation channel estimator 71 estimates the test strength information $y^{(I)}_{test}$ (second signal strength) from the test complex propagation channel $h^{(I)}_{test}$.

Figure 7:
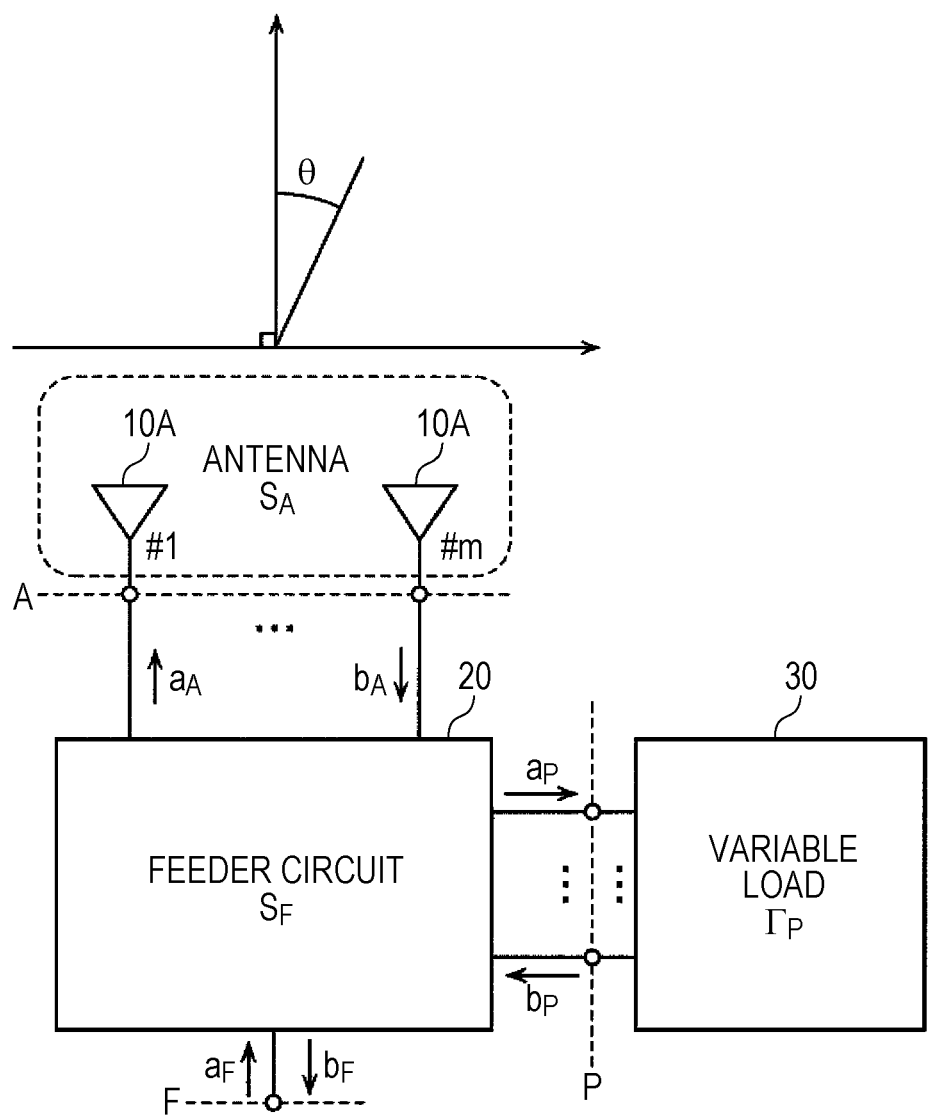
FIG. 7 illustrates a circuit of an antenna model of the first embodiment.

FIG. 7 illustrates a circuit of an antenna model of the first embodiment.

$S_A$, $S_F$, and $\Gamma_P$ represent scattering (S) parameter matrices of antenna 10A, feeder circuit 20, and the variable load 30, and respectively expressed by formulas (6) through (8):

$$S_A = \begin{bmatrix} S_{A11} & \cdots & S_{A1m} \\ \vdots & \ddots & \vdots \\ S_{Am1} & \cdots & S_{Amm} \end{bmatrix} \qquad (6)$$

$$S_F = \begin{bmatrix} S_{FF} & S_{FA} & S_{FP} \\ S_{AF} & S_{AA} & S_{AP} \\ S_{PF} & S_{PA} & S_{PP} \end{bmatrix} \qquad (7)$$

$$\Gamma_P = \begin{bmatrix} \gamma_{p1} & & 0 \\ & \ddots & \vdots \\ 0 & & \gamma_{Pm} \end{bmatrix} \qquad (8)$$

where $S_{FF}$, $S_{FA}$, $S_{FP}$, $S_{AF}$, $S_{AA}$, $S_{AP}$, $S_{PF}$, $S_{PA}$, and $S_{PP}$ are block matrices of $S_F$, and subscripts F, A, and P of $S_{FF}$, $S_{FA}$, $S_{FP}$, $S_{AF}$, $S_{AA}$, $S_{AP}$, $S_{PF}$, $S_{PA}$, and $S_{PP}$ respectively represent a feeder circuit port, an antenna port, and a variable load port.

$\Gamma_P$ is a diagonal matrix representing reflectance coefficients of the variable load 30.

The reflectance coefficient of $\#_1$-th variable load 30 is expressed by the following formula (9):

$$\gamma_i = \frac{z_{Pi} - z_0}{z_{Pi} + z_0} \qquad (9)$$

where $z_{Pi}$ and $z_o$ respectively represent the impedance value and reference impedance value of the variable load 30.

The S parameters of the antenna 10A and the feeder circuit 20 are determined during manufacturing, and are thus measurable in advance. The impedance value of the variable load 30 is also measurable in advance. The S parameter matrices, and elements expressed by the formulas (6) through (8) and impedance values of the variable loads are all known values.

Now, $a_A$ represents a signal incident on the antenna 10A from the feeder circuit 20, $b_A$ represents a signal incident on the feeder circuit 20 from the antenna 10A, $a_P$ represents a signal incident on the variable load 30 from the feeder circuit 20, $b_P$ represents a signal incident on the feeder circuit 20 from the variable load 30, $a_F$ represents a signal incident on the feeder circuit 20 from a feeder end, and $b_F$ represents a signal reflected to the feeder end from the feeder circuit 20.

The following formulas hold:

$$b_A = S_A a_A \qquad (10)$$

$$b_P = \Gamma_P a_P \qquad (11)$$

$$\begin{pmatrix} b_F \\ a_A \\ a_P \end{pmatrix} = \begin{bmatrix} S_{FF} & S_{FA} & S_{FP} \\ S_{AF} & S_{AA} & S_{AP} \\ S_{PF} & S_{PA} & S_{PP} \end{bmatrix} \begin{pmatrix} a_F \\ b_A \\ b_P \end{pmatrix} \qquad (12)$$

Formulas (10) through (12) may be rewritten as follows:

$$a_A = S_{AF} a_F + S_{AA} b_A + S_{AP} b_P \qquad (13)$$

$$= S_{AF} a_F + S_{AA} S_A a_A + S_{AP} b_P \qquad (14)$$

$$a_P = S_{PF} a_F + S_{PA} b_A + S_{PP} b_P \qquad (15)$$

$$= S_{PF} a_F + S_{PA} S_A a_A + S_{PP} b_P \qquad (16)$$

$$= \Gamma_P^{-1} b_P \qquad (17)$$

From formulas (16) and (17), formulas (18) and (19) hold:

$$S_{PF} a_F + S_{PA} S_A a_A = (\Gamma_P^{-1} - S_{PP}) b_P \qquad (18)$$

$$b_P = (\Gamma_P^{-1} - S_{PP})^{-1} (S_{PF} a_F + S_{PA} S_A a_A) \qquad (19)$$

If formula (19) is combined with formula (14), the following formula (20) holds:

$$a_A = S_{AF} a_F + S_{AA} S_A a_A + S_{AP}(\Gamma_P^{-1} - S_{PP})^{-1}(S_{PF} a_F + S_{PA} S_A a_A) \qquad (20)$$

Formula (20) is rewritten into formula (21) as follows:

$$a_A = \{I - S_{AA} S_A - S_{AP}(\Gamma_P^{-1} - S_{PP})^{-1} S_{PA} S_A\}^{-1} \qquad (21)$$

$$\{S_{AF} + S_{AP}(\Gamma_P^{-1} - S_{PP})^{-1} S_{PF}\} a_F$$

Thus, $$= \Phi(\Gamma_P) a_F \qquad (22)$$

Formula (23) holds as follows:

$$\Phi(\Gamma_P) = \{I - S_{AA} S_A - S_{AP}(\Gamma_P^{-1} - S_{PP})^{-1} S_{PA} S_A\}^{-1} \qquad (23)$$

$$\{S_{AF} + S_{AP}(\Gamma_P^{-1} - S_{PP})^{-1} S_{PF}\}$$

The signal $a_A$ incident on the antenna 10A responsive to the signal $a_F$ incident on the feeder end is calculated in accordance with formulas (22) and (23).

Let $D_i(\theta)$ represent the complex directivity of $\#_1$-th antenna 10A, and combined directivity observed is expressed by formula (24):

$$D_{array}(\theta)=[D_1(\theta),\ldots,D_m(\theta)]\Phi(\Gamma_P) \qquad (24)$$

The complex directivity of the antenna 10A with any variable load 30 terminated with a port P is calculated. The complex directivity of the antenna 10A is measurable in advance, and is thus a known value. For explanation purposes, the directivity for transmission with the signal $a_F$ applied to the feeder terminal F is described, in other words, the antenna 10A used as a transmitting antenna is described. Since the antenna is bilateral, the directivity expressed by formula (24) is applied to reception. The above discussion holds true if the antenna 10A is replaced with the receiving antenna 10.

1.4 Effects

In accordance with the positioning sensor 100 of the first embodiment and the method of using the positioning sensor 100, the direction to the moving object is estimated from the radio signal received by the receiver side without acquiring phase information from the transmitter side. Since the m receiving antennas 10 are connected to the feeder circuit 20, the freedom of the layout of the m receiving antennas 10 is increased.

In accordance with the first embodiment, the positioning sensor 100 and the method of using the positioning sensor 100 are free from the measurement of phase and the phase level synchronization between the transmitter and receiver. The use of relatively low-cost transmitter and receiver is thus possible. Since the use of the parasitic antenna eliminates the need for the phase measurement, the number of receivers is reduced.

Specifically, the positioning sensor 100 of the first embodiment includes the m receiving antennas 10 connected to the feeder circuit 20 and the n variable loads 30, and the single receiver 40 observes a reception signal. Since the characteristics of the m receiving antennas 10 are known, the receiver 40 acquires a received signal strength indicator (RSSI) by changing the load condition of the receiving antennas 10. The positioning sensor 100 thus estimates the complex propagation channel without acquiring the phase information of the transmitter. In other words, reflectance is changed and the directivity of the receiving antenna is pseudonically changed by changing the variable load of the receiving antenna (impedance value). To this end, the directivity of the antenna is pseudonically changed by multiple times (equal to or above an unknown numbers in the complex propagation channel), and simultaneous equations are formed from the strengths of the signals received by the receiver. By solving the simultaneous equations using steepest descent method, the complex propagation channel is estimated.

The complex propagation channel from the transmitting antenna of the positioning sensor 100 to the receiving antenna and the parasitic antenna connected to the receiver is estimated from the reception strength alone without using multiple receivers. Since the direction estimation is performed from the reception strength without the observation of the phase information, the positioning sensor 100 of the first embodiment employs a simple hardware configuration free from acquiring the phase information from the transmitter side, in other words, employs low-cost and commercially available transmitter and receiver.

Second Embodiment

The signal received by the positioning sensor 100 of the first embodiment includes in addition to a wave reflected from the living body 90 when a signal is transmitted from the transmitter 80 (transmitted wave), waves not via the living body 90 including a direct wave, and waves reflected from structures. A second embodiment is related to an estimation method of the living body 90 additionally accounting for the waves not reflected from the living body 90. The following discussion focuses on a difference between the first and second embodiments, and the discussion of the elements identical to those of the first embodiment is omitted herein.

2.1 Configuration of Positioning Sensor

A difference between a positioning sensor (not illustrated) of the second embodiment and the positioning sensor 100 of the first embodiment lies in that the positioning sensor includes a direction estimator 740 having a difference configuration.

Figure 8:
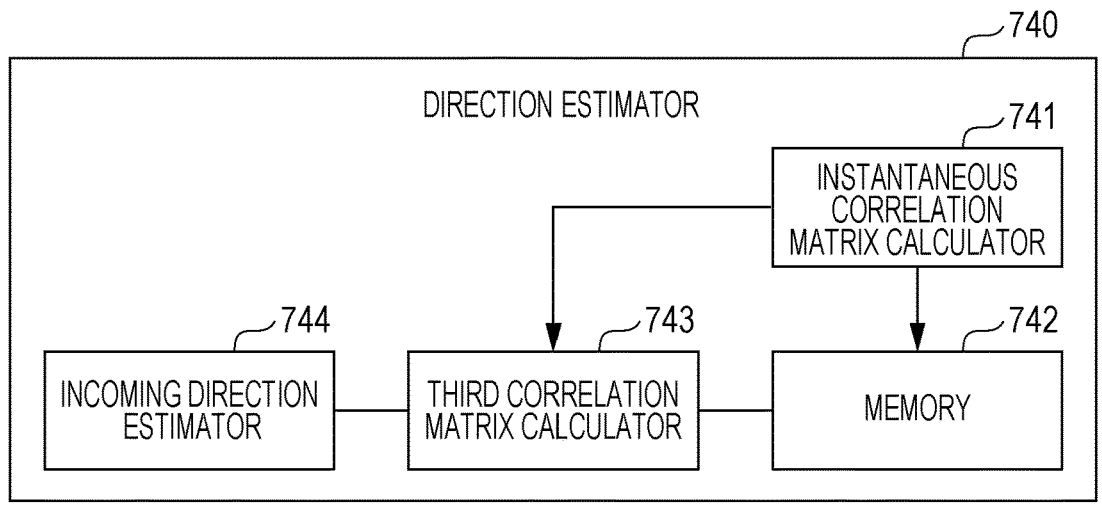
FIG. 8 illustrates a configuration example of a direction estimator of a second embodiment.

FIG. 8 illustrates a configuration example of the direction estimator 740 of the second embodiment.

The direction estimator 740 estimates an incoming direction of the first signal from the complex propagation channel estimated by the complex propagation channel estimator 71. As illustrated in FIG. 8 in accordance with the second embodiment, the direction estimator 740 includes an instantaneous correlation matrix calculator 741, a memory 742, a third correlation matrix calculator 743, and an incoming direction estimator 744.

The instantaneous correlation matrix calculator 741 calculates a first correlation matrix from a first complex propagation channel estimated by the complex propagation channel estimator 71, and causes the memory 742 to store the first correlation matrix. The instantaneous correlation matrix calculator 741 also calculates a second correlation matrix from a second complex propagation channel estimated by the complex propagation channel estimator 71.

In accordance with the second embodiment, the complex propagation channel estimator 71 estimates the first complex propagation channel as the complex propagation channel if a time variation in the first signal strength of the first signal received by the receiver 40 is equal to or below a predetermined value. If a time variation in first signal strength of the first signal received by the receiver 40 is above the predetermined value, the complex propagation channel estimator 71 estimates the second complex propagation channel as the complex propagation channel. The first signal having the first signal strength with the time variation thereof equal to or below the predetermined value does not contain a signal that is transmitted from the transmitting antenna 81 and reflected from the living body 90. If the time variation in the first signal strength is equal to or below the predetermined value, the receiver 40 receives the first signal in an unmanned state (in a state with the living body 90 not present). On the other hand, the first signal having the first signal strength with the time variation thereof above the predetermined value contains a signal that is transmitted from the transmitting antenna 81 and reflected from the living body 90. If the time variation in the first signal strength is above the predetermined value, the receiver 40 receives the first signal in a manned state (in a state with the living body 90 present).

The memory 742 is implemented by a hard disk drive (HDD) or a non-volatile memory. The memory 742 stores the first correlation matrix calculated by the instantaneous correlation matrix calculator 741.

The third correlation matrix calculator 743 calculates as a third correlation matrix a difference matrix that is obtained by subtracting the first correlation matrix stored on the memory 742 from the second correlation matrix calculated by the instantaneous correlation matrix calculator 741.

The incoming direction estimator 744 estimates an incoming direction of the first signal from the third correlation matrix calculated by the third correlation matrix calculator 743.

2.2 Process of Positioning Sensor

Figure 9:
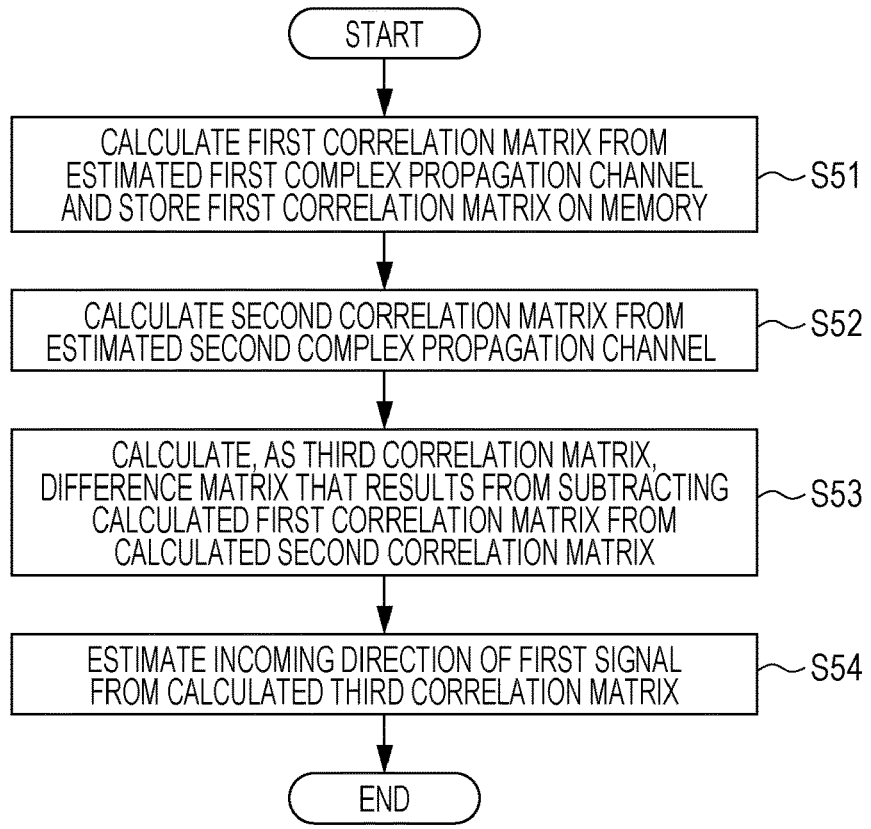
FIG. 9 is a flowchart illustrating the direction estimation process of the direction estimator of the second embodiment.
Figure 10:
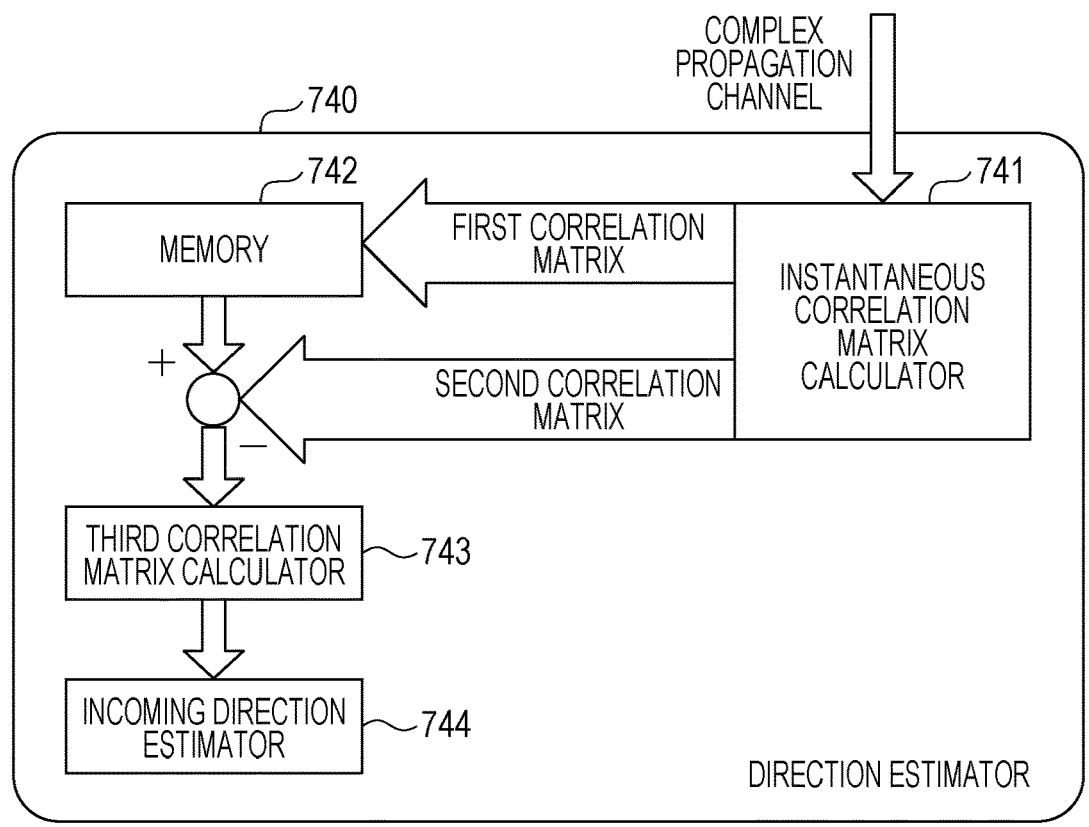
FIG. 10 illustrates a procedure of the direction estimation process of the direction estimator of the second embodiment.

The direction estimation process of the positioning sensor 100 of the second embodiment is described below. FIG. 9 is a flowchart illustrating the direction estimation process of the direction estimator 744 of the second embodiment. FIG. 10 illustrates a procedure of the direction estimation process of the direction estimator 744 of the second embodiment.

Before the direction estimation of the living body 90, the complex propagation channel estimator 71 estimates the first complex propagation channel in the state that the complex propagation channel estimator 71 determines to be unmanned (unmanned state). The direction estimator 740 calculates the first correlation matrix from the first complex propagation channel estimated by the complex propagation channel estimator 71 and stores the first correlation matrix on the memory 742 (S51).

More specifically, the instantaneous correlation matrix calculator 741 calculates an instantaneous correlation matrix $R_{01}$ from the first complex propagation channel h in the unmanned state estimated by the complex propagation channel estimator 71 in accordance with the following formula (25). In formula (25), $\{\bullet\}^H$ represents complex conjugate transpose.

$$R_{01} = hh^H \quad (25)$$

As expressed in formula (26), the instantaneous correlation matrix calculator 741 calculates, by L times, the instantaneous correlation matrix of formula (25), and averages L instantaneous correlation matrices. The resulting matrix is defined as a first correlation matrix $R_1$.

$$R_1 = \frac{1}{L}\sum_{i=1}^{L} R_{01}^{(1)} \quad (26)$$

The complex propagation channel estimator 71 then estimates the second complex propagation channel in the state that is determined to be manned (manned state). The direction estimator 740 calculates a second correlation matrix from the second complex propagation channel estimated by the complex propagation channel estimator 71 (S52).

Specifically, the instantaneous correlation matrix calculator 741 calculates an instantaneous correlation matrix $R_{02}$ from the second complex propagation channel h in the manned state estimated by the complex propagation channel estimator 71 in accordance with formula (27):

$$R_{02} = hh^H \quad (27)$$

As expressed by formula (28), the instantaneous correlation matrix calculator 741 calculates a matrix by calculating, by L times, the instantaneous correlation matrix represented by formula (27), and averaging the L matrices. The resulting matrix is defined as a second correlation matrix $R_2$.

$$R_2 = \frac{1}{L}\sum_{i=1}^{L} R_{02}^{(1)} \quad (28)$$

The direction estimator 740 calculates as the third correlation matrix a difference matrix that is obtained by subtracting the first correlation matrix stored on the memory 742 from the second correlation matrix calculated in step S52 (S53).

More specifically, the third correlation matrix calculator 743 calculates the third correlation matrix $R_3$ ($R_3=R_2-R_1$) by subtracting the first correlation matrix $R_1$ expressed in formula (26) from the second correlation matrix $R_2$ expressed in formula (28).

The direction estimator 740 estimates the incoming direction of the first signal from the calculated third correlation matrix (S54).

As described above, the first correlation matrix $R_1$ is calculated from the first complex propagation channel estimated in the unmanned state, and corresponds to a complex propagation channel component other than from the living body 90, such as a direct wave or a wave reflected from walls. On the other hand, the second correlation matrix $R_2$ is calculated from the complex propagation channel observed in the manned state, and is a sum of a component via the living body 90 and a fixed component not via the living body 90.

If the first correlation matrix $R_1$ is subtracted from the second correlation matrix $R_2$, only a component via the living body 90 ideally remains. Using the third correlation matrix $R_3$, the incoming direction estimator 744 may estimate the incoming direction of the first signal, namely, the direction to the living body 90 under a multi-path environment such as an indoor space.

2.3 Effects

Even in the multi-path environment such as an indoor space, the positional sensor and the method of using the positional sensor estimate the direction to the moving object from the radio signal received by the receiver side, without acquiring the phase information of the transmitter side.

Third Embodiment

In accordance with the second embodiment, the direction to the living body 90 is estimated by removing the complex propagation channel component responsive to the direct wave and waves from walls, other than from the living body 90. The disclosure is not limited to this method. In a method different from the method of the second embodiment, a third embodiment estimates the direction to the living body 90 by removing the complex propagation channel component other than from the living body 90. The following discussion focuses on a difference between the first embodiment and the third embodiment and the discussion on the same elements is omitted herein.

3.1 Configuration of Positioning Sensor

A positioning sensor of the third embodiment (not illustrated) is different from the positioning sensor 100 of the first embodiment in that the positional sensor of the third embodiment includes a direction estimator 840.

Figure 11:
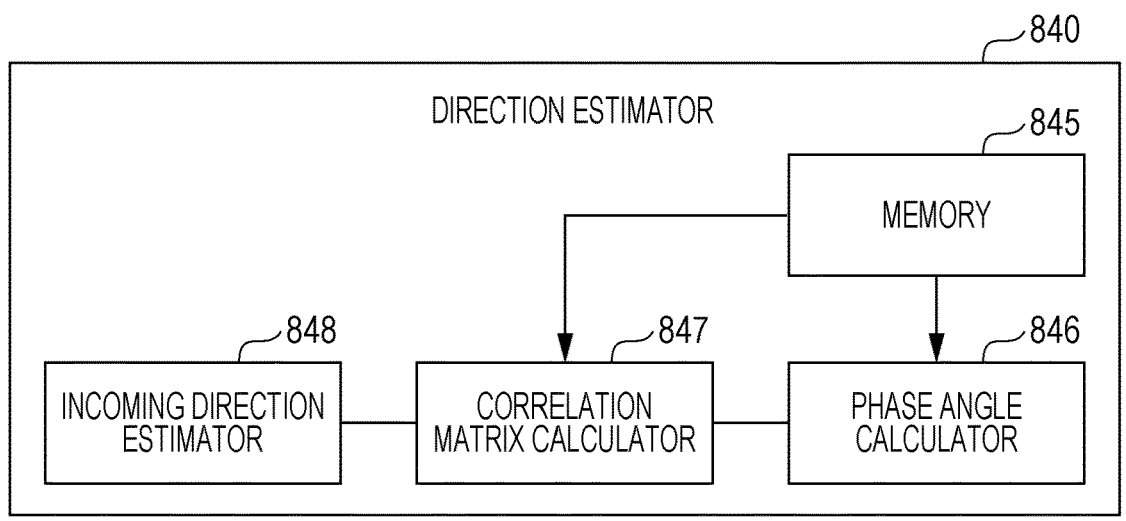
FIG. 11 illustrates a configuration example of a direction estimator of a third embodiment.

FIG. 11 illustrates a configuration example of the direction estimator 840 of the third embodiment.

The direction estimator 840 estimates the incoming direction of the first signal from the complex propagation channel estimated by the complex propagation channel estimator 71. In accordance with the third embodiment, the direction estimator 840 includes a memory 845, a phase angle calculator 846, a correlation matrix calculator 847, and an incoming direction estimator 848 as illustrated in FIG. 11.

The memory 845 is implemented by an HDD or a non-volatile memory. The memory 845 stores the first complex propagation channel estimated by the complex propagation channel estimator 71. In accordance with the third embodiment, the memory 845 stores the first complex propagation channel that the complex propagation channel estimator 71 estimates as the complex propagation channel at a specific time.

The phase angle calculator 846 compares the phase difference of the first complex propagation channel stored on the memory 845 with the phase difference of the second complex propagation channel estimated by the complex propagation channel estimator 71. The second complex propagation channel is estimated by the complex propagation channel estimator 71 as the complex propagation channel at a time later than the specific time.

The phase angle calculator 846 searches for a phase rotation (phase angle) that minimizes the average phase difference, and calculates a third complex propagation channel that is a difference that is obtained by subtracting the first complex propagation channel from the second complex propagation channel with the searched phase rotation (phase angle).

The correlation matrix calculator 847 calculates a correlation matrix from the third complex propagation channel calculated by the phase angle calculator 846.

The incoming direction estimator 848 estimates the incoming angle (direction) of the first signal from the correlation matrix calculated by the correlation matrix calculator 847.

3.2 Process of Positioning Sensor

Figure 12:
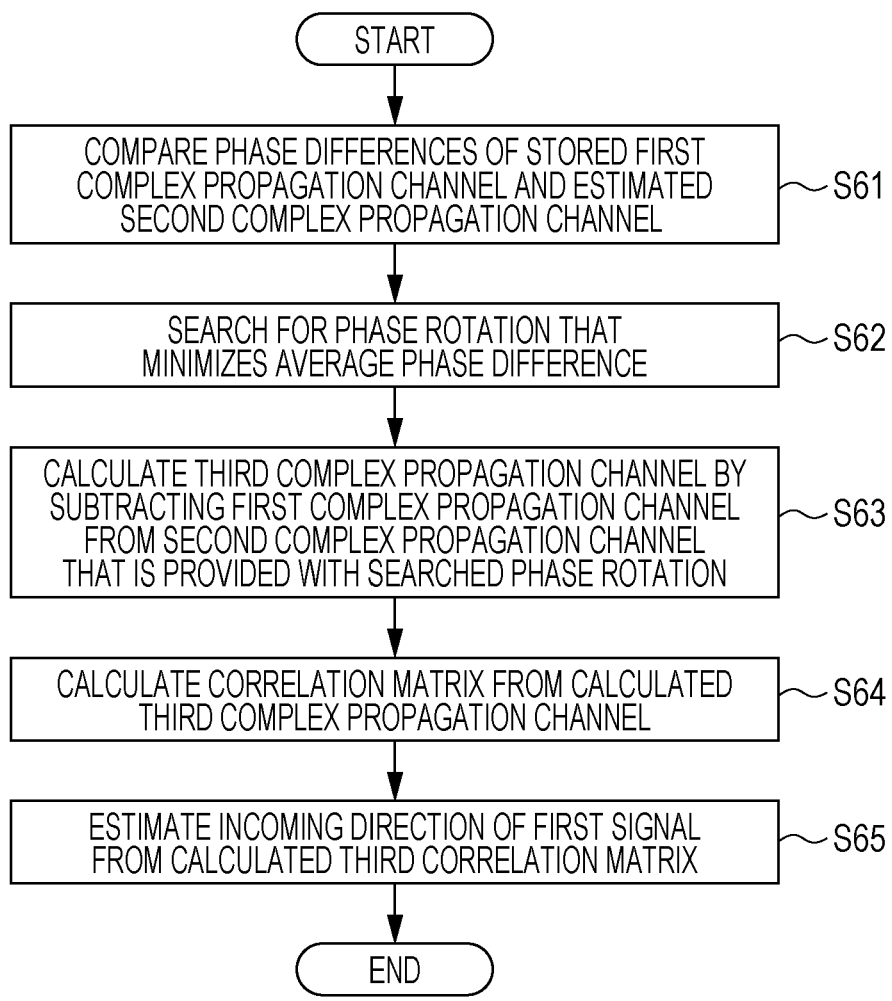
FIG. 12 is a flowchart illustrating the direction estimation process of the direction estimator of the third embodiment.
Figure 13:
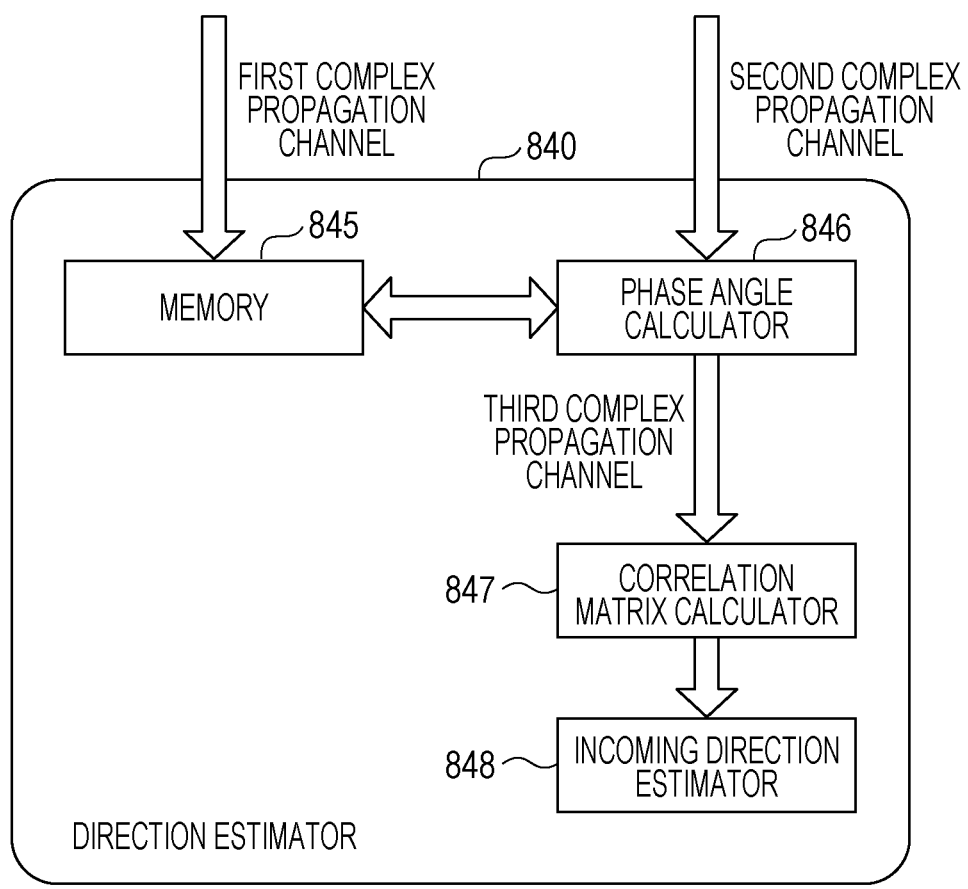
FIG. 13 illustrates a procedure of the direction estimation process of the direction estimator of the third embodiment.

The direction estimation process of the positioning sensor 100 of the third embodiment thus constructed is described below. FIG. 12 is a flowchart illustrating the direction estimation process of the direction estimator 740 of the third embodiment. FIG. 13 illustrates a procedure of the direction estimation process of the direction estimator 740 of the third embodiment.

The complex propagation channel estimator 71 stores on the memory 845 the complex propagation channel estimated at a given time point (specific time) as the first complex propagation channel $h^{(I)}$. A complex propagation channel estimated hereinafter (at a time later than the specific time) is referred to as the second complex propagation channel $h^{(I)}$. The letter I represents a measurement number corresponding to an observation time (estimation time).

The direction estimator 740 compares the first complex propagation channel stored on the memory 845 with the second complex propagation channel estimated at the time later than the specific time in terms of phase difference (S61), and searches for the phase rotation (phase angle) having a minimum average phase difference (S62).

More specifically, in a multi-path environment, the direct wave or wave reflected from walls have typically far higher signal strength level than the wave via the living body. For this reason, the phase of all the complex propagation channel elements does not vary greatly. The first complex propagation channel and the second complex propagation channel, estimated by the positioning sensor 100 of the third embodiment, are typically multiplied by random phase. This is because the positioning sensor 100 estimates the first complex propagation channel and the second complex propagation channel from the strength information alone. It is difficult to estimate an absolute channel phase.

Based on the assumption that there is no change in a main component, namely, a fixed component, in the first complex propagation channel $h^{(1)}$ and the second complex propagation channel $h^{(1)}$, the phase angle calculator 846 may search for and determine a correction phase $\theta_1$ that minimizes $\Delta p^{(I)}$ in the following formula (29):

$$\Delta p^{(I)} = |h^{(I)} e^{-j\theta I} - h^{(1)}| \tag{29}$$

The direction estimator 740 calculates the third complex propagation channel by subtracting the first complex propagation channel from the second complex propagation channel having the phase rotation (phase angle) searched for in step S62 (S63).

The phase angle calculator 846 calculates a difference channel using the correction phase $\theta_I$ searched using formula (29) in accordance with the following formula (30). The difference channel is referred to as a third complex propagation channel $\Delta h^{(I)}$.

$$\Delta h^{(I)} = h^{(I)} e^{-j\theta I} - h^{(I)} \tag{30}$$

The direction estimator 740 calculates the correlation matrix from the third complex propagation channel calculated in step S63 (S64).

More specifically, the correlation matrix calculator 847 calculates the correlation matrix R from the third complex propagation channel $\Delta h^{(I)}$ expressed by formula (30) in accordance with the following formula (31):

$$R = \frac{1}{L} \sum_{i=1}^{L} \Delta h^{(1)} \Delta h^{(1)M} \tag{31}$$

Since the difference channel (the third complex propagation channel) is determined in the subtraction operation expressed in formula (30) as described above, the correlation matrix R expressed in formula (31) includes only a component related to the living body 90 with a constant component deleted.

If the correlation matrix R expressed in formula (31) is determined, a variety of direction estimation methods are applicable. The direction estimation method described above is free from the estimation of the first complex propagation channel in the unmanned state, and even if a propagation environment is changed with structures moved, the direction to the living body 90 is estimated.

3.3 Effects

Even if a propagation condition in the multi-path environment in the indoor space changes, the positioning sensor and the method of the positioning sensor of the third embodiment estimate the direction to the moving body from the radio signal received by the receiver without acquiring the phase information of the transmitter side.

Fourth Embodiment

In accordance with the first through third embodiments, the direction to the living body 90 is estimated by estimating the complex propagation channel from the first signal strength of the first signal received by the receiver 40. The disclosure is not limited to this method. The direction to the living body 90 may be estimated by estimating the complex propagation channel from the signal strength that is obtained by optimizing the first signal strength of the first signal received by the receiver 40. In the discussion of a fourth embodiment, the elements identical to those of the first embodiment are omitted and only a difference therebetween is described.

4.1 Configuration of Positioning Sensor

A positioning sensor of the fourth embodiment (not illustrated) is different from the positioning sensor 100 of the first embodiment in that positioning sensor of the fourth embodiment includes a memory 600, a complex propagation channel estimator 710, and a direction estimator 940. As described above, the controller 50 in the positioning sensor 100 controls the impedance value of the variable load 30. In the discussion that follows, the controller 50 sets combinations of the impedance values of the variable loads 30 of the m receiving antennas 10 to be K (K is an integer equal to or above 2).

Figure 14:
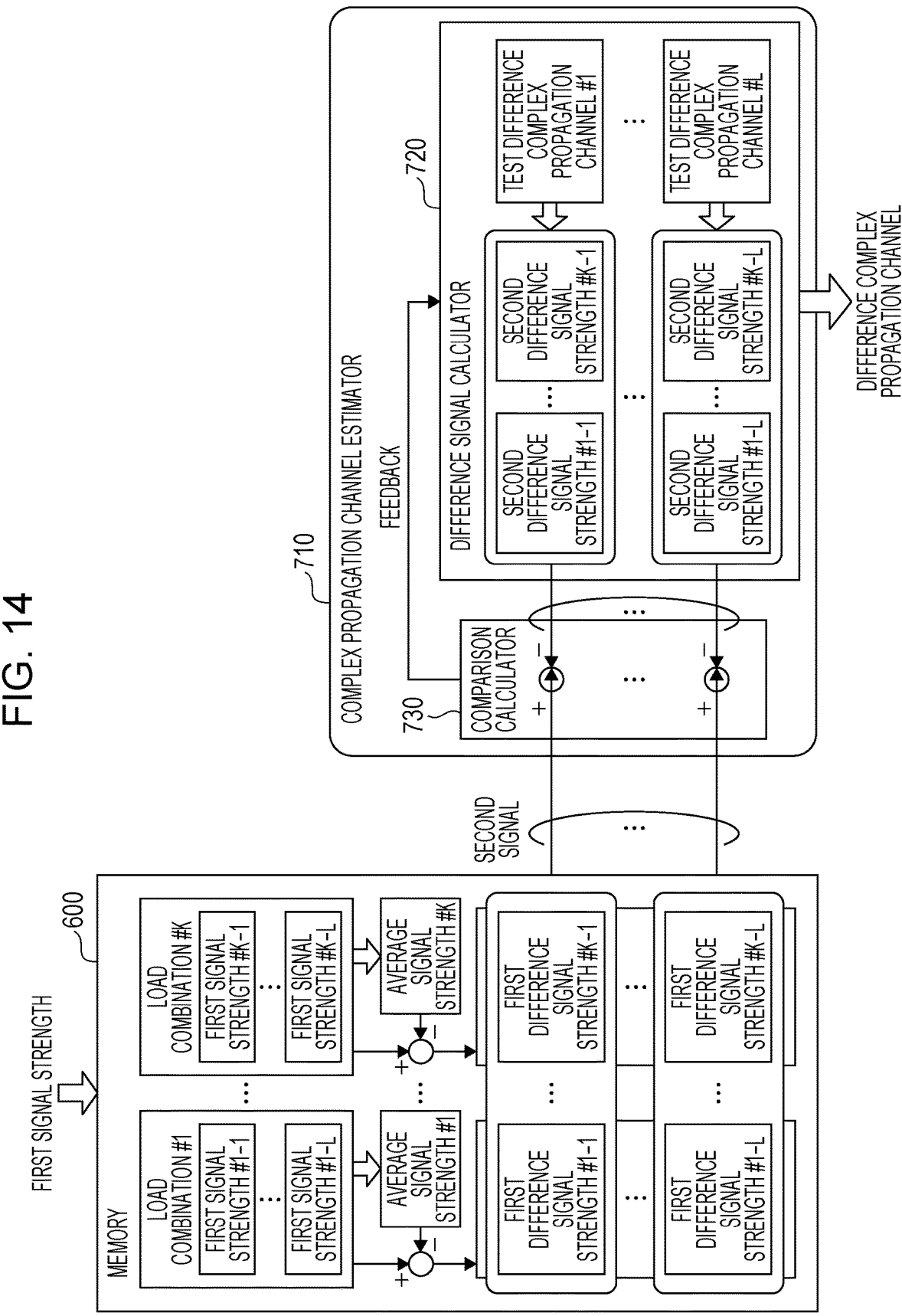
FIG. 14 illustrates a configuration example of a memory and complex propagation channel estimator of a fourth embodiment.

FIG. 14 illustrates a configuration example of the memory 600 and the complex propagation channel estimator 710 of the fourth embodiment.

The memory 600 accumulates, by L times, the first signal strength of the first signal received by the receiver 40 with each of the K combinations of impedance values of the variable loads 30 (L is an integer equal to or larger than 2), and calculates a first average signal strength that is an average of the L signal strengths in each of the K combinations. The memory 600 calculates and accumulates K×L first difference signal strengths which are obtained by subtracting the first average signal strength from each of the L first signal strengths in each of the K combinations.

In accordance with the fourth embodiment, the memory 600 records strength information of the first signal (first signal strength) in each of the K combinations of the impedance values of the variable loads 30 (load values), and then observes the strength information by L times as illustrated in FIG. 14. In other words, K×L pieces of the strength information of the first signal (first signal strengths) are recorded.

A first combination of loads is now considered. The positioning sensor of the fourth embodiment observes the strength information by L times. The memory 600 accumulates the L pieces of strength information of first signal #1-1 through #1-L (first signal strengths #1-1 through #1-L). The memory 600 calculates the average signal strength #1 that is an average of the L pieces of strength information (the first signal strengths), and subtracts the average signal intensity #1 from each of the accumulated first signal strengths #1-1 through #1-L. In this way, the memory 600 obtains first difference signal strengths #1-1 through #1-L.

The operation described above is performed on each of the K combinations.

The memory 600 not only accumulates the first signal strengths of the K×L first signals received by the receiver 40, but also accumulates K×L first difference signal strengths that are obtained by optimizing the first signal strengths.

Referring to FIG. 14, the complex propagation channel estimator 710 includes a difference signal calculator 720 and a comparison calculator 730.

The difference signal calculator 720 sets L test difference complex propagation channels respectively having specific values, and calculates K second difference signal strengths for each of the set L test difference complex propagation channels.

In cooperation with the difference signal calculator 720, the comparison calculator 730 searches for the value of the test difference complex propagation channel that minimizes a difference, from among differences between the K first difference signal strengths stored on the memory 600 and the calculated second difference signal strengths. The comparison calculator 730 estimates the L test difference complex propagation channels having the searched values to be L difference complex propagation channels when the receiver 40 receives the first signal.

In accordance with the fourth embodiment, the difference signal calculator 720 sets the test difference complex propagation channel (#1) corresponding to a first observation to any value. Assuming that the test difference complex propagation channel (#1) is correct, the difference signal calculator 720 calculates test difference signal strengths #1-1 through #K-1 (a total of K signal strengths) corresponding to the combinations of loads in accordance with formula (2). The test difference signal strength is the strength information that the receiver 40 is determined to receive when the corresponding loads are combined, and the test difference signal strength corresponds to the second difference signal strength.

The comparison calculator 730 subtracts the K test difference signal strengths (second difference signal strengths) calculated by the difference signal calculator 720 from the K first difference signal strengths calculated by the memory 600, and compares the difference results. The subtraction operation in this case is performed by comparing the difference signal strengths on the same load combination. In this way, K difference values result. The comparison calculator 730 evaluates the K difference values using an evaluation function, for example, by summing the absolute values of the obtained K difference values, and feeds back the evaluation results to the difference signal calculator 720.

The difference signal calculator 720 re-sets the test difference complex propagation channel (#1), based on the feedback results, and calculates K test difference signal strengths (second difference signal strengths) from the test difference complex propagation channel (#1). The comparison calculator 730 performs the comparison operation again.

The complex propagation channel estimator 710 estimates the difference complex propagation channel by iterating the above procedure until the comparison result is minimized. The difference complex propagation channel may be estimated using the steepest descent method. The complex propagation channel estimator 710 further iterates this operation by L times, thereby estimating L time-lapsed difference complex propagation channels.

Figure 15:
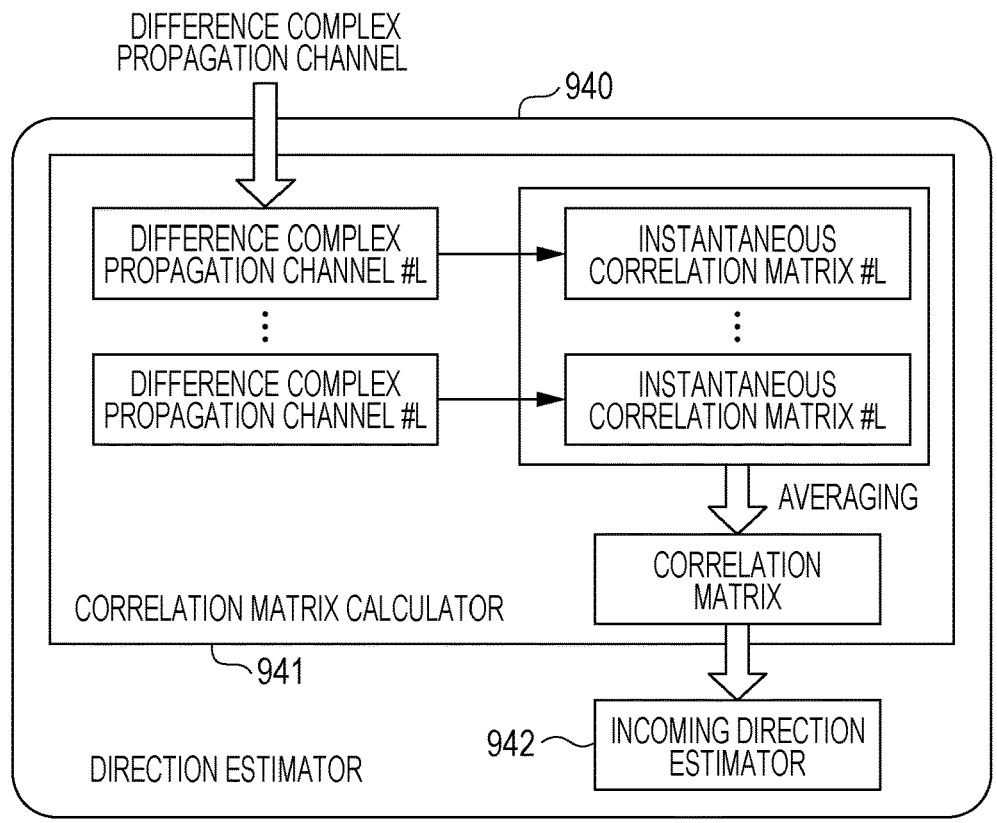
FIG. 15 illustrates a configuration example of a direction estimator of the fourth embodiment.

FIG. 15 illustrates a configuration example of a direction estimator 940 of the fourth embodiment.

The direction estimator 940, including a correlation matrix calculator 941 and an incoming direction estimator 942, estimates the incoming direction of the first signal from the difference complex propagation channel estimated by the complex propagation channel estimator 710. The correlation matrix calculator 941 calculates a correlation matrix from the L difference complex propagation channels estimated by the complex propagation channel estimator 710. The incoming direction estimator 942 estimates the incoming direction of the first signal from the correlation matrix calculated by the correlation matrix calculator 941.

In accordance with the fourth embodiment, the correlation matrix calculator 941 converts each difference complex propagation channel estimated by the complex propagation channel estimator 710 into an instantaneous correction matrix. The instantaneous correlation matrix calculator 741 averages the converted L instantaneous correlation matrices on a per element basis, thereby calculating a correlation matrix. The incoming direction estimator 942 estimates the incoming direction of the first signal from the correlation matrix calculated by the correlation matrix calculator 941. The incoming direction of the first signal is a direction to the living body 90 that serves as a detection target.

4.2 Process of Positioning Sensor

The process of each of the memory 600, complex propagation channel estimator 710, and direction estimator 940 thus constructed is described below.

Figure 16:
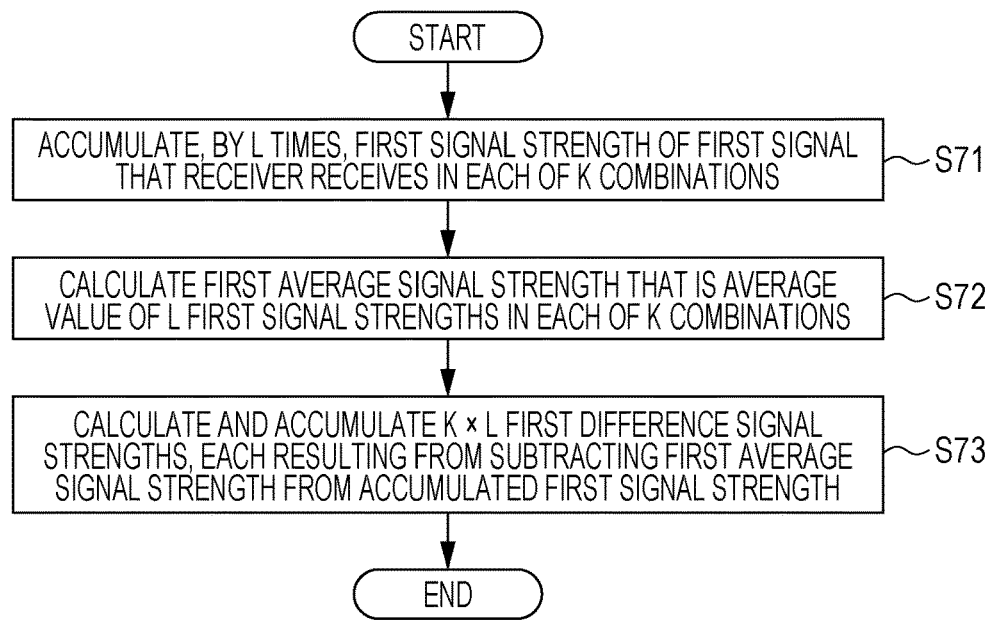
FIG. 16 is a flowchart illustrating an estimation process of a memory of the fourth embodiment.

FIG. 16 is a flowchart illustrating an estimation process of the memory 600 of the fourth embodiment.

The memory 600 accumulates, by L times, the first signal strength of the first signal that the receiver 40 receives in each of the K combinations of the impedance values of the variable loads 30 (L is an integer equal to or above 2) (S71).

The memory 600 calculates the first average signal strength that is an average value of the L first signal strengths in each of the K combinations (S72).

The memory 600 calculates and accumulates K×L first difference signal strengths, each being determined by subtracting the average first signal strength from each of the L first signal strengths stored in each of the K combinations (S73).

Figure 17:
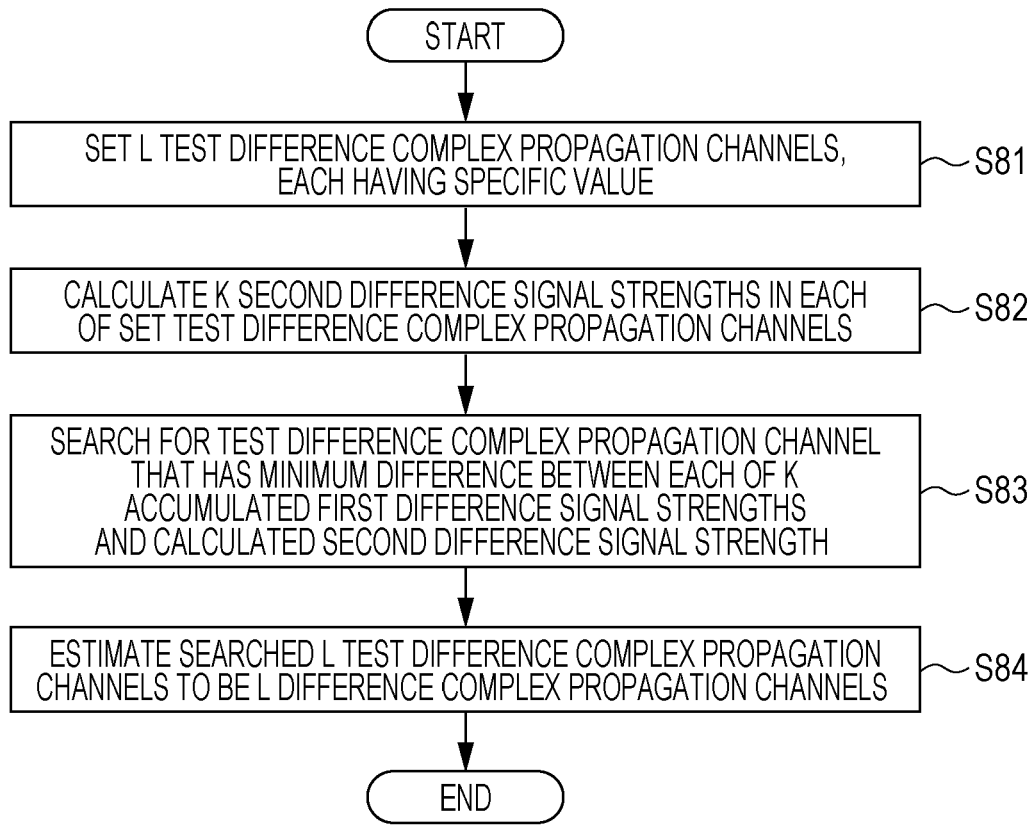
FIG. 17 is a flowchart illustrating an estimation process of a complex propagation channel estimator of the fourth embodiment.

FIG. 17 is a flowchart illustrating an estimation process of the complex propagation channel estimator 710 of the fourth embodiment.

The complex propagation channel estimator 710 sets the L test difference complex propagation channels respectively having specific values (S81).

The complex propagation channel estimator 710 calculates K second difference signal strengths in each of the set L test difference complex propagation channels (S82).

The complex propagation channel estimator 710 searches for a test difference complex propagation channel that minimizes the difference between each of the K first signal strengths stored on the memory 600 and the calculated second difference signal strength (S83).

The complex propagation channel estimator 710 estimates the L test difference complex propagation channels having the searched values to be L difference complex propagation channels when the receiver 40 receives the first signal (S84).

Figure 18:
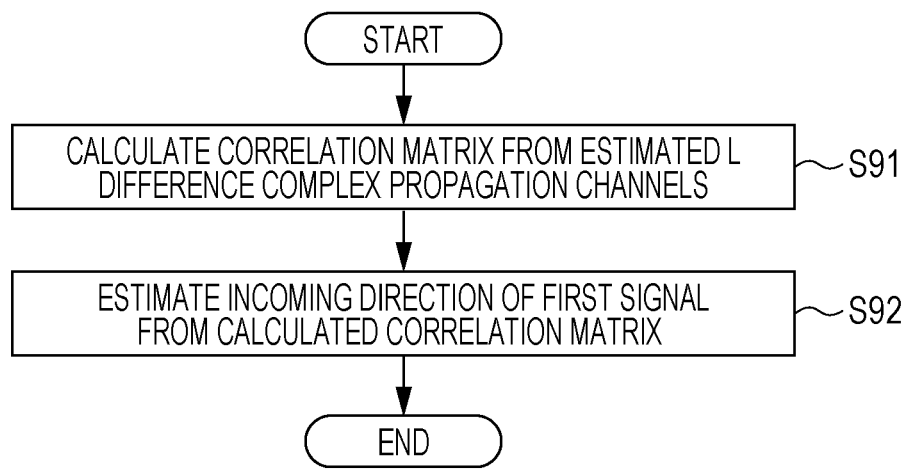
FIG. 18 is a flowchart illustrating an estimation process of a direction estimator of the fourth embodiment.

FIG. 18 is a flowchart illustrating an estimation process of the direction estimator 940 of the fourth embodiment.

The direction estimator 940 calculates the correlation matrix from the L difference complex propagation channels estimated by the complex propagation channel estimator 710 (S91).

The direction estimator 940 estimates the incoming direction of the first signal from the correlation matrix calculated in step S91 (S92).

4.3 Effects

Even in a multi-path environment such as in an indoor space, the positioning sensor and the method of the positioning sensor of the fourth embodiment may estimate the direction to the moving body from the radio signal received by the receiver side without acquiring the phase information from the transmitter side.

More specifically, the positional sensor of the fourth embodiment includes the m receiving antennas connected to the feeder circuit and the n variable loads, and observes the signal received by the single receiver. Since the characteristics of the m receiving antennas 10 are known, the receiver acquires a received signal strength indicator (RSSI) by changing the load condition of the receiving antenna in K different conditions. The positioning sensor thus estimates the complex propagation channel using the steepest descent method without acquiring the phase information of the transmitter. In other words, reflectance is changed and the directivity of the receiving antenna is pseudonically changed by changing the variable load of the receiving antenna (impedance value). To this end, the directivity of the antenna is pseudonically changed by multiple times (equal to or above an unknown numbers in the complex propagation channel), and simultaneous equations are formed from the strength of the signal received by the receiver. By solving the simultaneous equations using the steepest descent method, the complex propagation channel is estimated.

An experiment was conducted to evaluate the effect of the fourth embodiment as described below.

Figure 19:
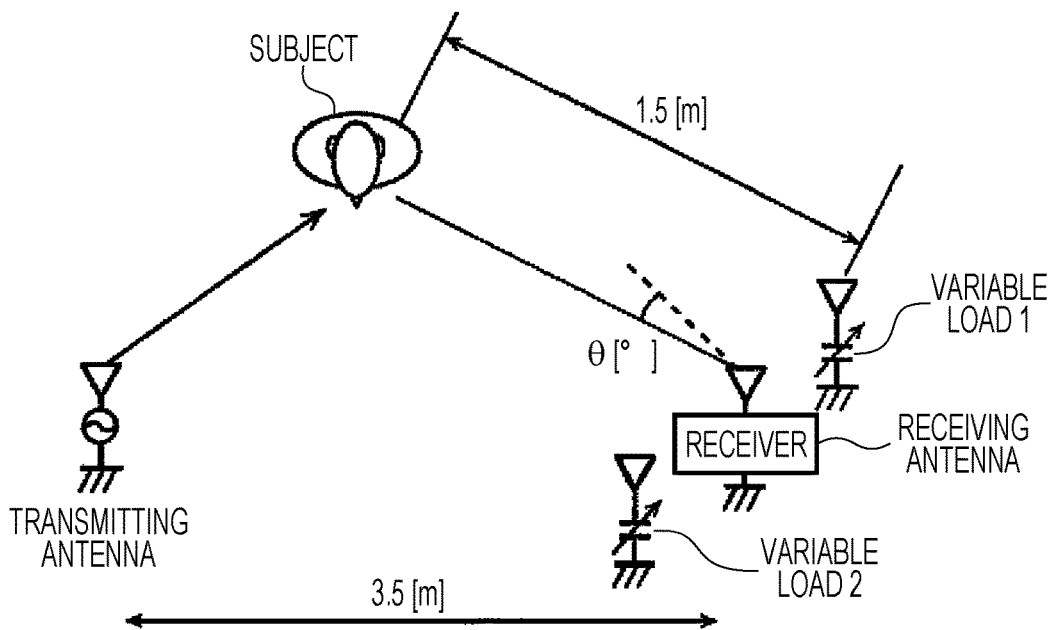
FIG. 19 illustrates a concept of an experiment of a direction estimation method of the fourth embodiment.

FIG. 19 illustrates a concept of the experiment of a direction estimation method of the fourth embodiment.

The antenna structure in the experiment of FIG. 19 includes a one-element square patch antenna of 2.47 GHz as a transmitting antenna, and a three-element patch arrayed antenna including as a receiving antenna a one-element square patch antenna, and two-element parasitic antenna. The level of the transmitting antenna and the receiving antenna is set at 1.05 meters as high as the abdomen of a subject (living body). The distance between the transmitting antenna and the receiving antenna is 3.5 meters, and the distance between the receiving antenna and the subject is 1.5 meters. The subject stands still at an angle of −20° with respect to the front of the antenna. The observation time is 12.8 seconds, and the number of combinations of the values of the variable loads K=16, and the number of observations L=128.

Figure 20:
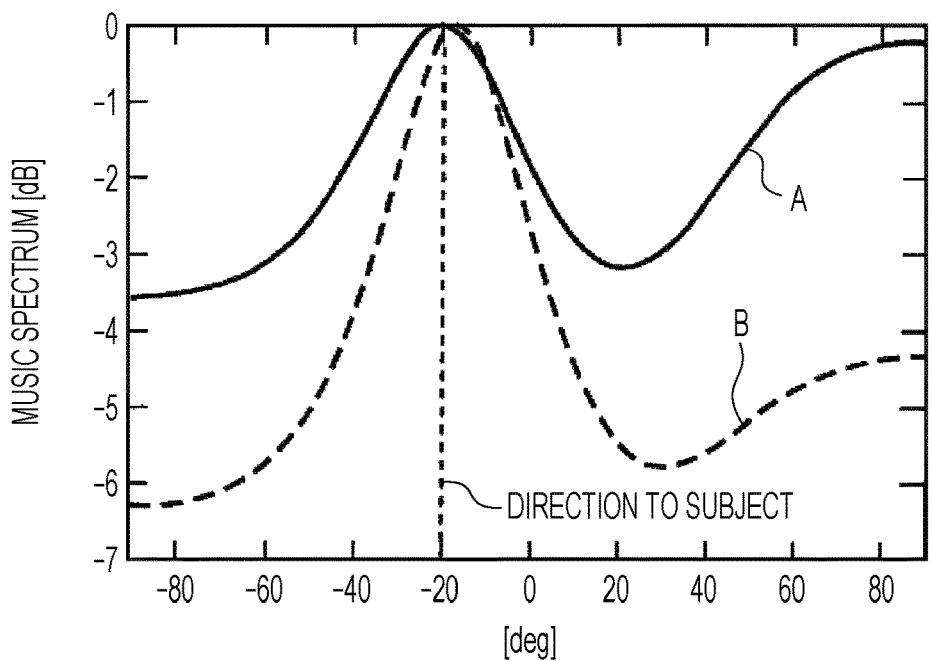
FIG. 20 illustrates experiment results of an estimation method of the fourth embodiment.

FIG. 20 illustrates experiment results of the estimation method of the fourth embodiment. As illustrated in FIG. 20, the multiple signal classification method (MUSIC) is used in the direction estimation process.

As illustrated in FIG. 20, the abscissa represents angle with respect to the antenna front, and the ordinate represents MUSIC spectrum intensity. A maximum value in the MUSIC spectrum corresponds to the incoming direction. A solid curve A represents experiment results using the estimation method of the fourth embodiment. As a comparison example, a broken line curve B represents experiment results using a related-art estimation method. The related-art estimation method acquires and uses the phase information of the transmitter side. The experiment results represented by the broken line curve B are obtained when the direction is estimated after all the complex propagation channels are observed using a three-element square patch arrayed antenna, and a constant reflection component is removed from observation data of 12.8 seconds.

As illustrated in FIG. 20, the estimation method of the fourth embodiment enables the direction to the living body to be estimated at a higher accuracy level. An angle error is 0.7°.

It is thus verified that the direction to the living body is estimated at a sufficiently high accuracy level compared to the relate-art technique.

The positioning sensors and the methods of the positioning sensors of the embodiments of the disclosure have been described. The disclosure is not limited to the embodiments. The changes and variations of the embodiments obvious to one of ordinary skill in the art or an embodiment that is constructed by combining different elements from the embodiments may fall within the scope of the disclosure.

In accordance with the first through fourth embodiments, the direction to the living body 90 is estimated. The direction estimation target is not limited to the living body 90. The disclosure is applicable to a moving body (a machine) that causes a Doppler effect in a reflected wave when a high-frequency signal is directed to the moving body.

A sensor including at least two positioning sensors of one of the first through fourth embodiments located at two different places may be used. The location of a moving body may be estimated in accordance with the incoming directions of the first signals determined by at least two positioning sensors. More specifically, in accordance with the first through fourth embodiments, a method of estimating the location for the sensor using at least two positioning sensors located at two different places is provided. A first signal contains a signal reflected from a moving body when a signal is transmitted to the moving body, and the location of the moving body is estimated through trigonometry in accordance with the incoming directions of the first signals estimated by at least two positioning sensors. A position where the incoming directions of the first signals estimated by at least two positioning sensors intersect may be estimated to be the location of the moving body.

Figure 21:
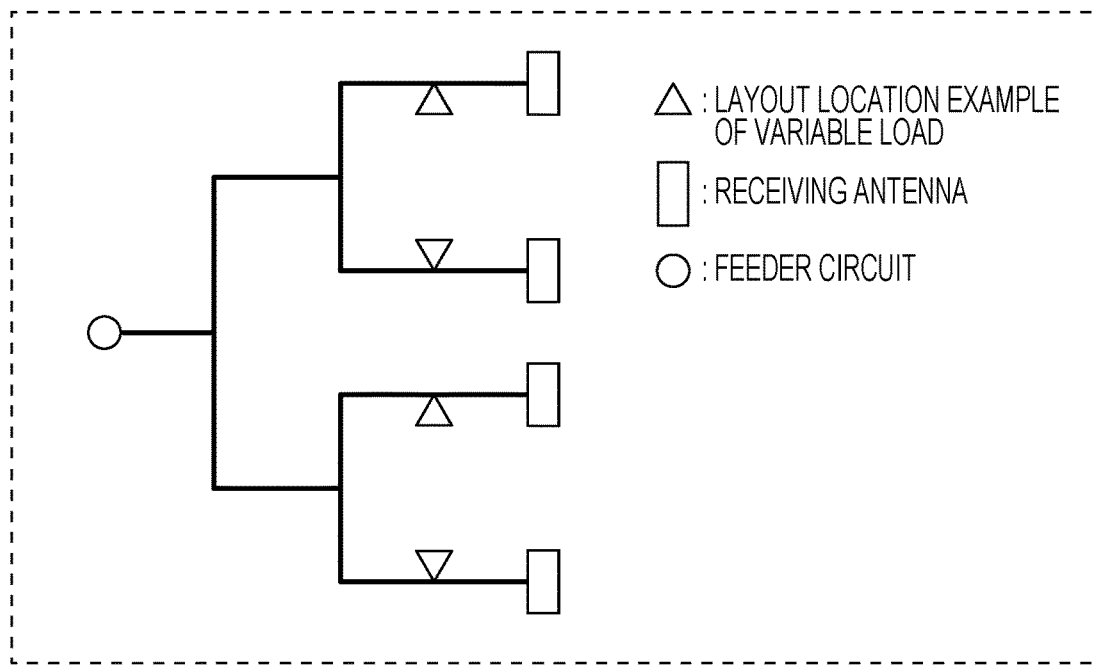
FIG. 21 illustrates a layout example of a feeder circuit, a variable load, and a receiving antenna in a positioning sensor.
Figure 22:
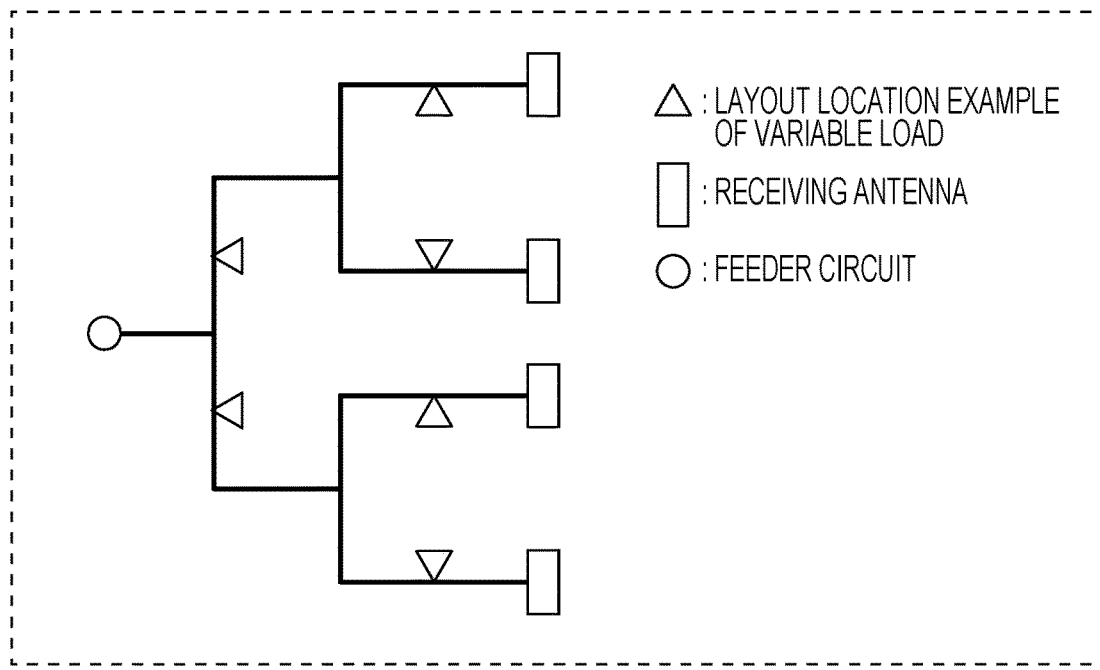
FIG. 22 illustrates a layout example of a feeder circuit, a variable load, and a receiving antenna in a positioning sensor.

The positioning sensor may include the n variable loads 30 and the m receiving antennas 10 with n being equal to m. As illustrated in FIG. 21 in such a case, the variable load may be located close to the arrayed antenna. If n is larger than m, the variable load may also be located closer to a branch point as illustrated in FIG. 22. FIG. 21 illustrates a layout example of a feeder circuit, variable loads, and receiving antennas in the positioning sensor. FIG. 22 illustrates another layout example of the feeder circuit, variable loads, and receiving antennas in the positioning sensor.

The disclosure is not only implemented as the positioning sensor including characteristic elements described above, but also implemented as the estimation method including steps corresponding to the characteristic elements included in the positioning sensor. The disclosure may also be implemented as a computer program that causes a computer to perform such characteristic steps included in the method. The computer program may be distributed on a non-transitory computer-readable recording medium, such as a compact-disk read-only memory (CD-ROM), or via a communication network, such as the Internet.

The disclosure finds applications in a direction estimation method, a position estimation method, and a direction estimation apparatus estimating a direction to or a location of a moving body using a radio signal. In particular, the disclosure finds applications in a measurement apparatus that measures a direction to and a location of a moving body, such as a living body or a machine, a home appliance that performs control in response to the direction to and the location of the moving body, a direction estimation method of a monitoring apparatus that detects an intrusion of a moving body, and a direction estimating apparatus using the direction estimation method, position estimation method, and scattering cross section.

What is claimed is:

1. A positioning sensor, comprising:
   m receiving antennas, where m is an integer equal to or above 1;
   a feeder circuit that is connected to the receiving antennas;
   n variable loads connected to the feeder circuit, where n is an integer equal to or above 1;
   a receiver that receives via the receiving antennas and the feeder circuit a first signal responsive to a signal that a transmitter has transmitted in a specific area from the positioning sensor within which a moving object is likely to be present;
   a controller that sets an impedance value for each variable load;
   a memory that stores a first signal strength value indicating a strength of the first signal responsive to the impedance value of the variable load that is set by the controller; and
   a processor configured to perform
      setting K set of impedance values for the n variable loads, where K is an integer equal to or above 2,
      acquiring K first signal strength values, each of the K first signal strength values is the first signal strength value at a respective set of impedance values out of the K set of impedance values,
      calculating a third correlation matrix, corresponding to a complex propagation channel, based on the K first signal strength values, the complex propagation channel indicating signal propagation characteristics between the transmitter and the receiver, and
      estimating an incoming direction of the first signal to the positioning sensor, based on the third correlation matrix.

2. The positioning sensor according to claim 1, wherein the processor is configured to further perform
   estimating a first complex propagation channel, the first complex propagation channel is the complex propagation channel at a time when a time variation in the first signal strength value is equal to or below a predetermined value,
   estimating a second complex propagation channel, the second complex propagation channel is the complex propagation channel at a time when the time variation in the first signal strength value is above the predetermined value,
   calculating a first correlation matrix indicating a correlation matrix for the first complex propagation channel,
   calculating a second correlation matrix indicating a correlation matrix for the second complex propagation channel
   calculating the third correlation matrix by subtracting the first correlation matrix from the second correlation matrix.

3. The positioning sensor according to claim 1,
   wherein the processor is configured to further perform
      determining whether the moving object is present in the specific area from the positioning sensor,
      estimating a first complex propagation channel, the first complex propagation channel is the complex propagation channel at a time when the moving object is determined not to be in the specific area,
      estimating a second complex propagation channel, the second complex propagation channel is the complex propagation channel at a time when the moving object is determined to be in the specific area,
      calculating a first correlation matrix indicating a correlation matrix for the first complex propagation channel,
      calculating a second correlation matrix indicating a correlation matrix for the second complex propagation channel, and
      calculating the third correlation matrix by subtracting the first correlation matrix from the second correlation matrix.

4. The positioning sensor according to claim 1,
   wherein the processor is configured to further perform
      estimating a first complex propagation channel, the first complex propagation channel is the complex propagation channel at a first time point,
      estimating a second complex propagation channel, the second complex propagation channel is the complex propagation channel at a second time point, the second time point being a time point after the first time point,
      calculating a correction phase based on the first complex propagation channel and the second complex propagation channel, calculating a third complex propagation channel based on the first complex propagation channel and the second complex propagation channel and the correction phase, and calculating the third correlation matrix based on the third complex propagation channel.

5. A sensor, comprising:

a plurality of the positioning sensors according to claim 1 mounted in mutually different locations, wherein the location of the moving body is estimated based on the incoming direction of the first signal to each of the positioning sensors.

6. A positioning sensor, comprising:

m receiving antennas, where m is an integer equal to or above 1;

a feeder circuit that is connected to the receiving antennas;

n variable loads connected to the feeder circuit, where n is an integer equal to or above 1;

a receiver that receives via the receiving antennas and the feeder circuit a first signal responsive to a signal that a transmitter has transmitted in a specific area from the positioning sensor within which a moving object is likely to be present;

a controller that sets an impedance value for each variable load;

a memory; and a processor, wherein the controller sets K impedance values to each variable load, where K is an integer equal to or above 2, wherein the receiver receives, by L times, the first signal responsive to each of the K impedance values of the variable load, where L is an integer equal to or above 2, wherein the memory stores L first signal strength values responsive to each of the K impedance values of the variable load, the first signal strength value indicating a strength of the first signal, and wherein the processor calculates an average value of the L first signal strength values responsive to each of the K impedance values of the variable load, calculates K×L second signal strength values by subtracting the average value from each of the L first signal strength values responsive to each of the K impedance values of the variable load, sets M candidates, each having K elements, wherein M is an integer equal to or above 2, to the L complex propagation channels responsive to the L first signals, the complex propagation channel indicating signal propagation characteristics between the transmitter and the receiver, calculates M third signal strength values, each having K elements, the third signal strength value being received by the receiver when the variable load is set to be in the K impedance values with respect to each of the L complex propagation channels, estimates the L complex propagation channels by selecting a candidate from the M candidates, the candidates having a minimum difference between the M third signal strength values and the corresponding second signal strength values with respect to each of the L complex propagation channels, calculates a correlation matrix for each of the L complex propagation channels, and estimates an incoming direction of the first signal to the positioning sensor in accordance with the correlation matrix.

7. A method for a positioning sensor estimating an incoming direction of a signal, the positioning sensor including m receiving antennas, where m is an integer equal to or above 1, a feeder circuit connected to the receiving antennas, n variable loads connected to the feeder circuit, wherein n is an integer equal to or above 1, a receiver, and a controller, the method comprising:

setting an impedance value for each variable load;

receiving via the receiving antennas and the feeder circuit a first signal responsive to a signal that a transmitter has transmitted in a specific area from the positioning sensor within which a moving object is likely to be present;

storing a first signal strength value indicating a strength of the first signal responsive to the impedance value of the variable load that is set by the controller;

setting a plurality of candidates for a complex propagation channel indicating signal propagation characteristics between the transmitter and the receiver;

calculating a plurality of second signal strength values when the receiver receives a second signal transmitted from the transmitter, the second signal strength value indicating a strength of the second signal, the second signal strength values respectively corresponding to the candidates;

estimating the complex propagation channel by selecting a candidate from the plurality of candidates, the candidate having a minimum difference between the first signal strength value and each of the second signal strength values; and estimating an incoming direction of the first signal to the positioning sensor in accordance with the complex propagation channel.

8. A method for a positioning sensor estimating an incoming direction of a signal, the positioning sensor including m receiving antennas where m is an integer equal to or above 1, a feeder circuit connected to the receiving antennas, n variable loads connected to the feeder circuit, where n is an integer equal to or above 1, a receiver, and a controller, and a memory, the method comprising:

setting K impedance values to each variable load, where K is an integer equal to or above 2;

receiving, by L times, via the receiving antennas and the feeder circuit a first signal responsive to a signal that a transmitter has transmitted in a specific area from the positioning sensor within which a moving object is likely to be present, the first signal responsive to each of the K impedance values of the variable load, where L is an integer equal to or above 2;

storing L first signal strength values responsive to each of the K impedance values of the variable load, the first signal strength value indicating a strength of the first signal;

calculating an average value of the L first signal strength values responsive to each of the K impedance values of the variable load;

calculating K×L second signal strength values by subtracting the average value from each of the L first signal strength values responsive to each of the K impedance values of the variable load;

setting M candidates, each having K elements, where M is an integer equal to or above 2, to the L complex propagation channels responsive to the L first signals, the complex propagation channel indicating signal propagation characteristics between the transmitter and the receiver;

with respect to each of the L complex propagation channels, calculating M third signal strength values, each having K elements, the third signal strength value being received by the receiver when the variable load is set to be in the K impedance values;

estimating the L complex propagation channels by selecting a candidate from among the M candidates, the candidate having a minimum difference between each of the M third signal strength values and the second signal strength value;

calculating a correlation matrix of each of the L complex propagation channels; and estimating an incoming direction of the first signal to the positioning sensor in accordance with the correlation matrix.

9. The positioning sensor according to claim 1,
wherein in the calculating the third correlation matrix,
assuming a plurality of candidate complex propagation matrix,
calculating a plurality of second signal strength values, each of the plurality of second signal strength values being calculated based on combination of the K impedance values and each of the plurality of candidate complex propagation matrix,
determining the complex propagation matrix based on the K first signal strength values and the plurality of second signal strength value, and
calculating the third correlation matrix based on the complex propagation matrix.

10. The positioning sensor according to claim 9,
wherein in the calculating the third correlation matrix,
the complex propagation matrix is one of the plurality of candidate complex propagation matrix having minimum difference between (i) the K first signal strength values, and (ii) respective K second signal strength values, which are included in the plurality of second signal strength values.

11. The positioning sensor according to claim 1,
wherein the processor is configured to further perform
determining the moving object is present in the specific area from the positioning sensor, when a time variation in the first signal strength value is above a predetermined value,
determining the moving object is not present in the specific area from the positioning sensor, when a time variation in the first signal strength value is equal to or below a predetermined value, and
estimating a second complex propagation channel, the second complex propagation channel is the complex propagation channel at a time when the time variation in the first signal strength value is above the predetermined value,
wherein, the estimating the incoming direction of the first signal is performed at a time when the moving object is determined to be present in the specific area from the positioning sensor.

12. The positioning sensor according to claim 4,
wherein in the calculating the correction phase
the correction phase is a phase $\theta_1$ which obtains minimum $\Delta p(1)$ according to following equation:

$$\Delta p(1) = |h(1)e^{-j\theta_1} - h(1)|$$

where,
h(1): the first complex propagation channel, and
h(1): the second complex propagation channel.

13. The positioning sensor according to claim 1,
wherein the feeder circuit simultaneously and electrically connects (i) one input terminal of the receiver, and (ii) the m receiving antennas, and
m is an integer equal to or above 2.

14. A positioning sensor, comprising:
m receiving antennas, where m is an integer equal to or above 2;
a feeder circuit that is connected to the receiving antennas;
n variable loads connected to the feeder circuit, where n is an integer equal to or above m;
a receiver that receives via the receiving antennas and the feeder circuit a first signal responsive to a signal that a transmitter has transmitted in a specific area from the positioning sensor within which a moving object is likely to be present;
a controller that sets an impedance value for each variable load;
a memory that stores a first signal strength value indicating a strength of the first signal responsive to the impedance value of the variable load that is set by the controller; and
a processor being configured to perform
estimating an incoming direction of the first signal to the positioning sensor,
wherein, the feeder circuit simultaneously and electrically connects (i) one input terminal of the receiver, and (ii) the m receiving antennas.

15. The positioning sensor according to claim 14,
wherein the processor being configured to perform
setting K set of impedance values for the n variable loads, where K is an integer equal to or above 2,
acquiring K first signal strength values, each of the K first signal strength values is the first signal strength value at respective set of impedance values out of the K set of impedance values,
calculating a third correlation matrix, corresponding to a complex propagation channel, based on the K first signal strength values, the complex propagation channel indicating signal propagation characteristics between the transmitter and the receiver, and
estimating an incoming direction of the first signal to the positioning sensor, based on the third correlation matrix.

16. The positioning sensor according to claim 14,
wherein n is an integer above m.

* * * * *